United States Patent
Tsukahara et al.

(10) Patent No.: US 9,703,432 B2
(45) Date of Patent: Jul. 11, 2017

(54) HEAD-MOUNTED DISPLAY

(71) Applicant: Sony Corporation, Tokyo (JP)

(72) Inventors: Tsubasa Tsukahara, Tokyo (JP);
Masatoshi Ueno, Kanagawa (JP);
Kenichi Kabasawa, Saitama (JP);
Shinobu Kuriya, Kanagawa (JP);
Tetsuro Goto, Tokyo (JP); Hisako Sugano, Kanagawa (JP); Toshiyuki Nakagawa, Kanagawa (JP); Hirotaka Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 14/380,906

(22) PCT Filed: Feb. 28, 2013

(86) PCT No.: PCT/JP2013/001199
§ 371 (c)(1),
(2) Date: Aug. 25, 2014

(87) PCT Pub. No.: WO2013/136696
PCT Pub. Date: Sep. 19, 2013

(65) Prior Publication Data
US 2015/0002465 A1 Jan. 1, 2015

(30) Foreign Application Priority Data

Mar. 13, 2012 (JP) .................. 2012-056382

(51) Int. Cl.
*G06F 3/041* (2006.01)
*G06F 3/044* (2006.01)
(Continued)

(52) U.S. Cl.
CPC ............. *G06F 3/044* (2013.01); *G02B 27/01* (2013.01); *G02B 27/017* (2013.01);
(Continued)

(58) Field of Classification Search
USPC ........................................ 345/174
See application file for complete search history.

(56) References Cited

U.S. PATENT DOCUMENTS

| 9,292,082 | B1 * | 3/2016 | Patel ................... G02B 27/017 |
| 2006/0119539 | A1 | 6/2006 | Kato et al. |

FOREIGN PATENT DOCUMENTS

| JP | 2004-233776 | 8/2004 |
| JP | 2008-070817 | 3/2008 |
| JP | 2011-197750 | 10/2011 |

OTHER PUBLICATIONS

International Search Report issued in connection with International Patent Application No. PCT/JP2013/001199, dated May 7, 2013. (1 page).

* cited by examiner

*Primary Examiner* — Gustavo Polo
(74) *Attorney, Agent, or Firm* — K&L Gates LLP

(57) ABSTRACT

To provide a head-mounted display excellent in portability and operability. A head-mounted display according to the present technology includes a main body and an input operation section. The main body includes a display section configured to present an image to a user and is configured to be mountable on a head of the user. The input operation section includes a first detection element that extends in a first axis direction and is provided in the main body and electrostatically detects an operation position in the first axis direction, and a first guide section that guides an input operation of the user along the first axis direction on the first detection element, and controls the image.

18 Claims, 24 Drawing Sheets

(51) Int. Cl.
  *G06F 3/0362* (2013.01)
  *G02B 27/01* (2006.01)
  *H04N 5/74* (2006.01)
  *H04N 5/64* (2006.01)

(52) U.S. Cl.
  CPC ....... *G02B 27/0172* (2013.01); *G06F 3/0362* (2013.01); *H04N 5/7491* (2013.01); *G02B 2027/014* (2013.01); *G02B 2027/0178* (2013.01); *H04N 5/64* (2013.01)

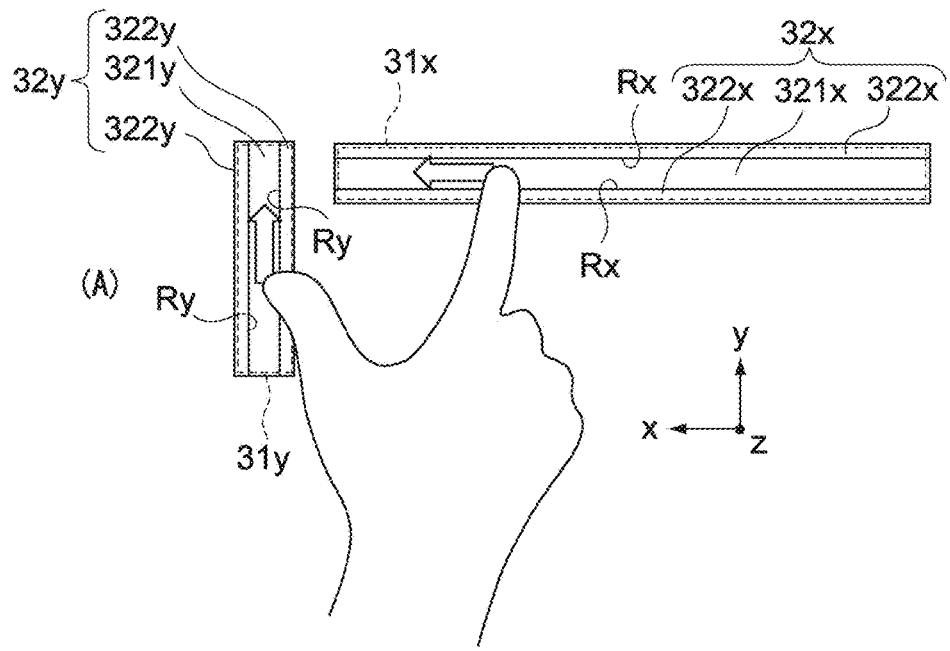
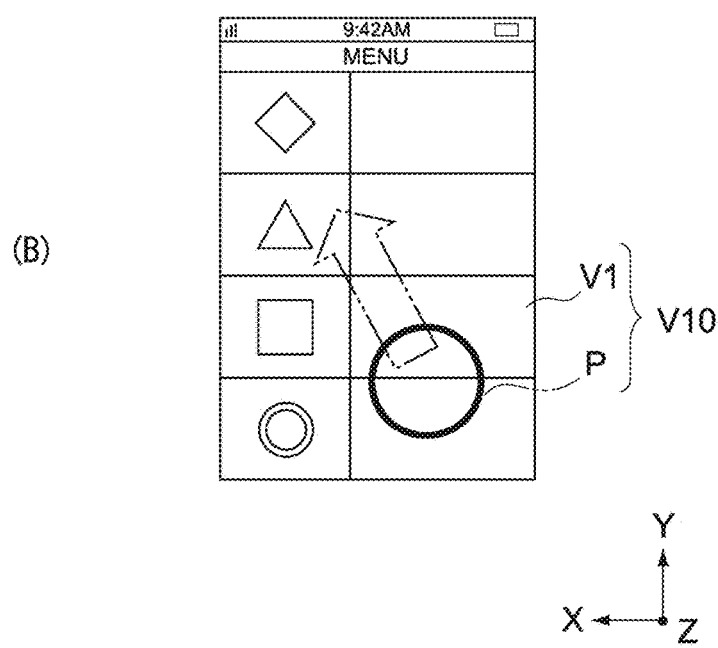
FIG.6

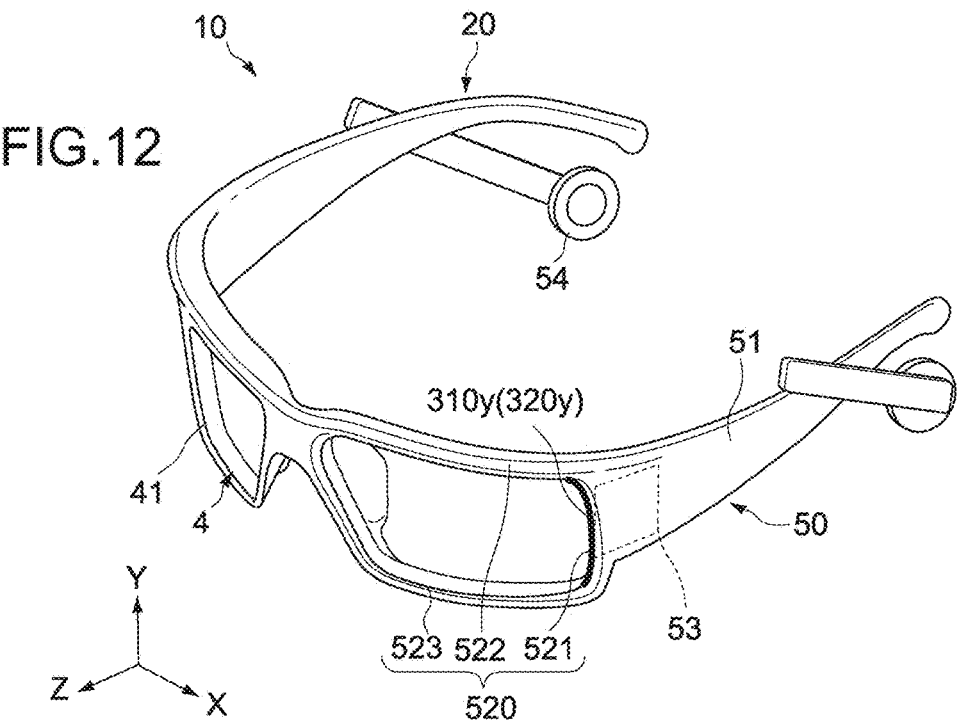
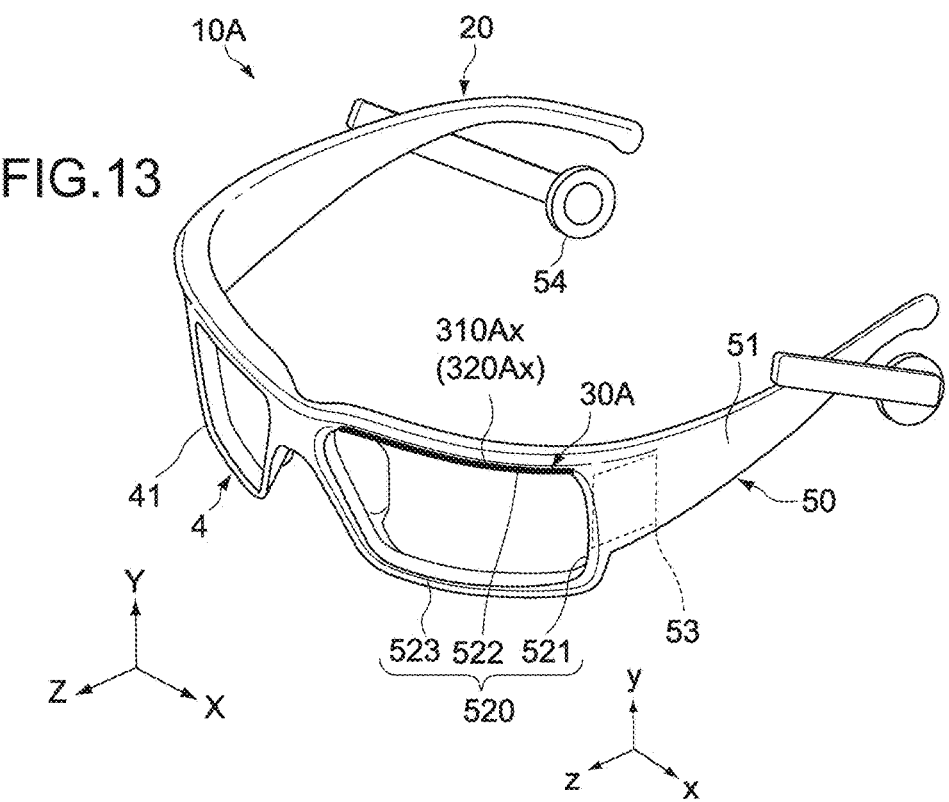

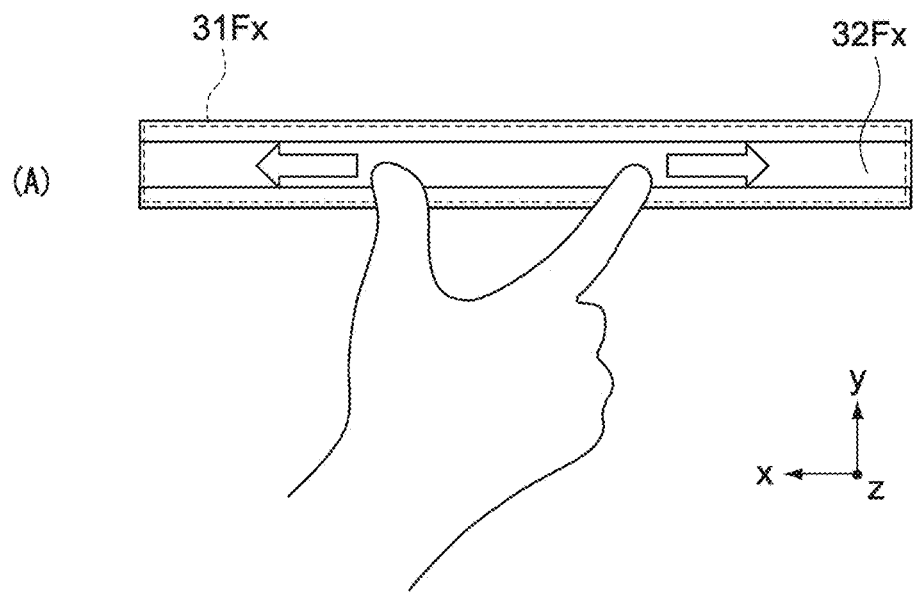
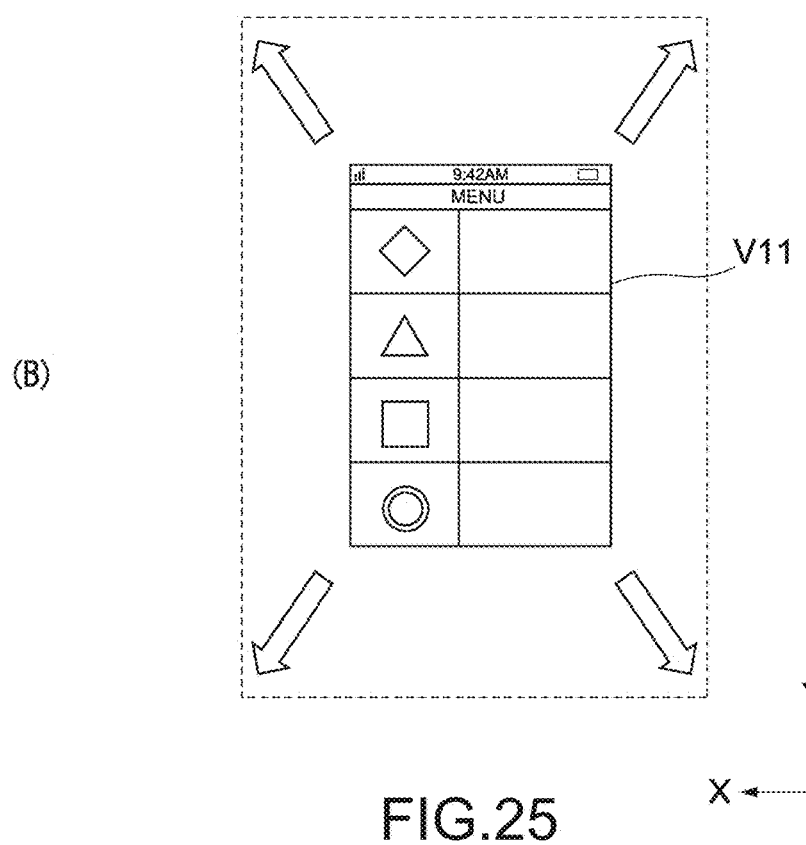
FIG.25

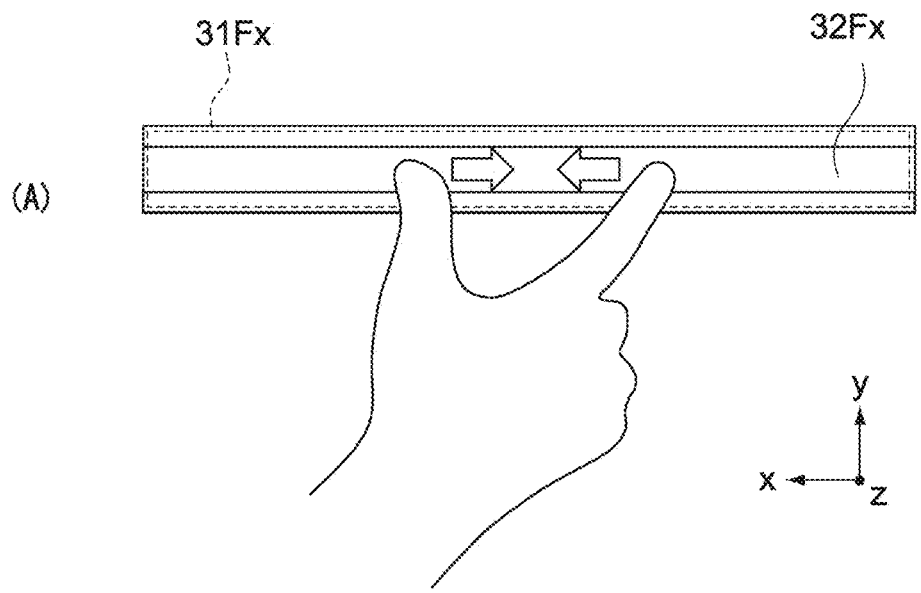
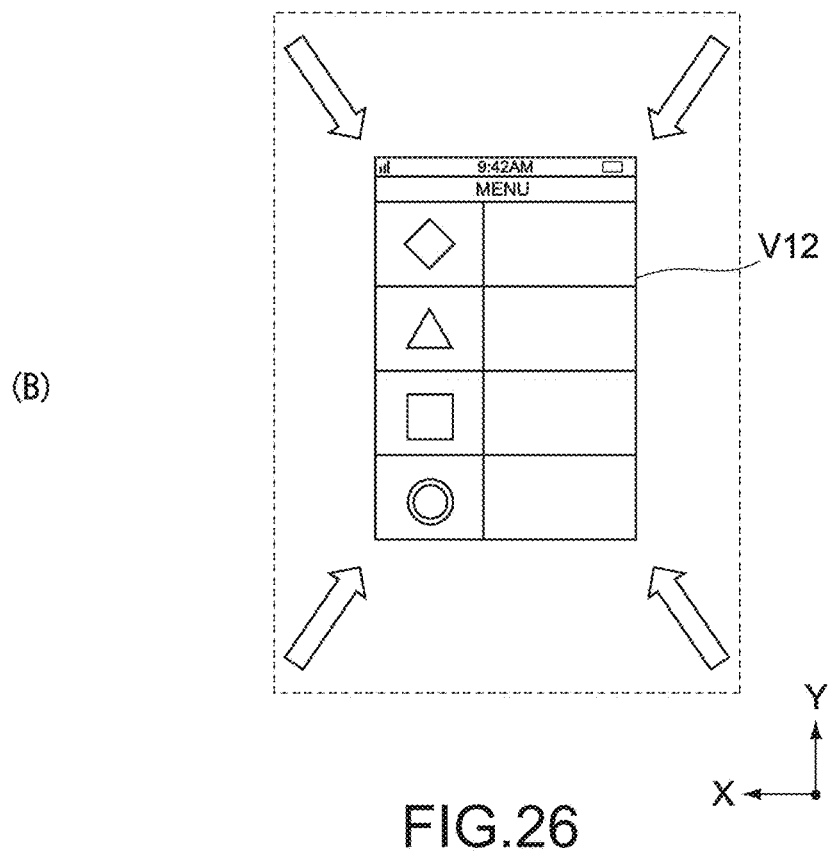
FIG.26

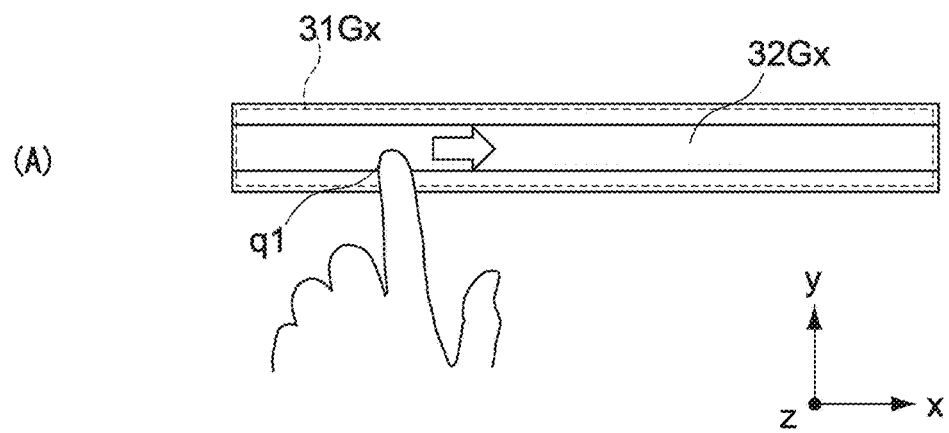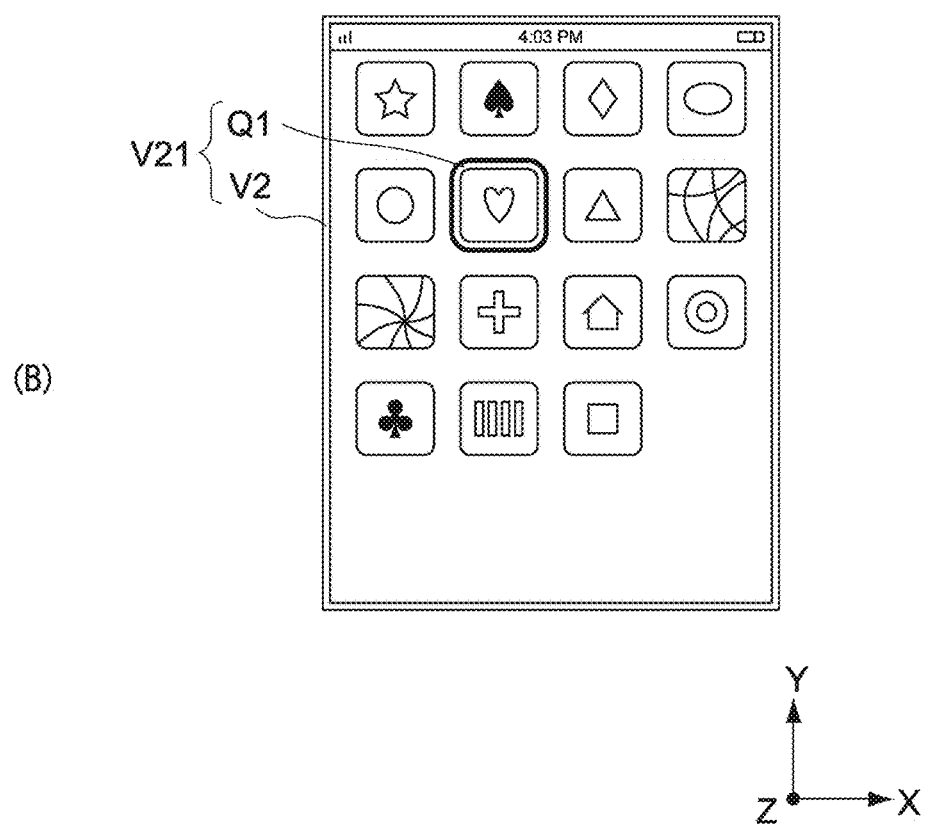
FIG.27

(A) 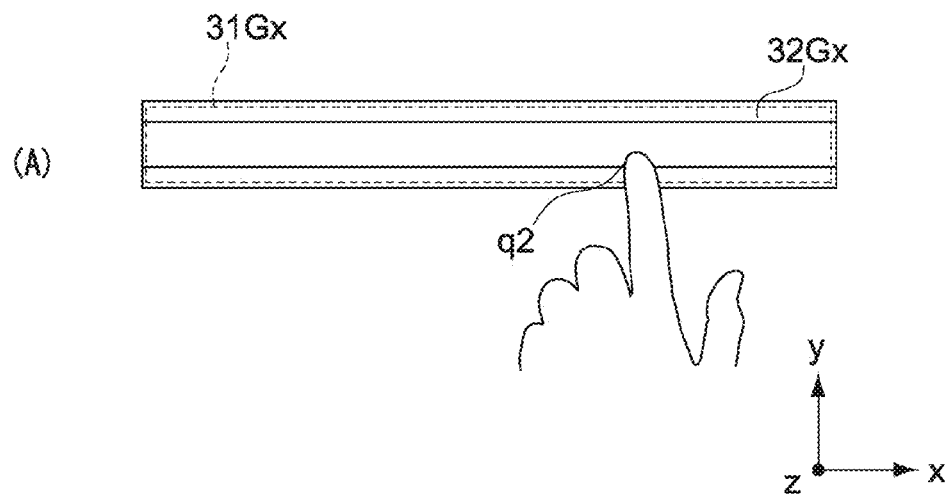
(B) 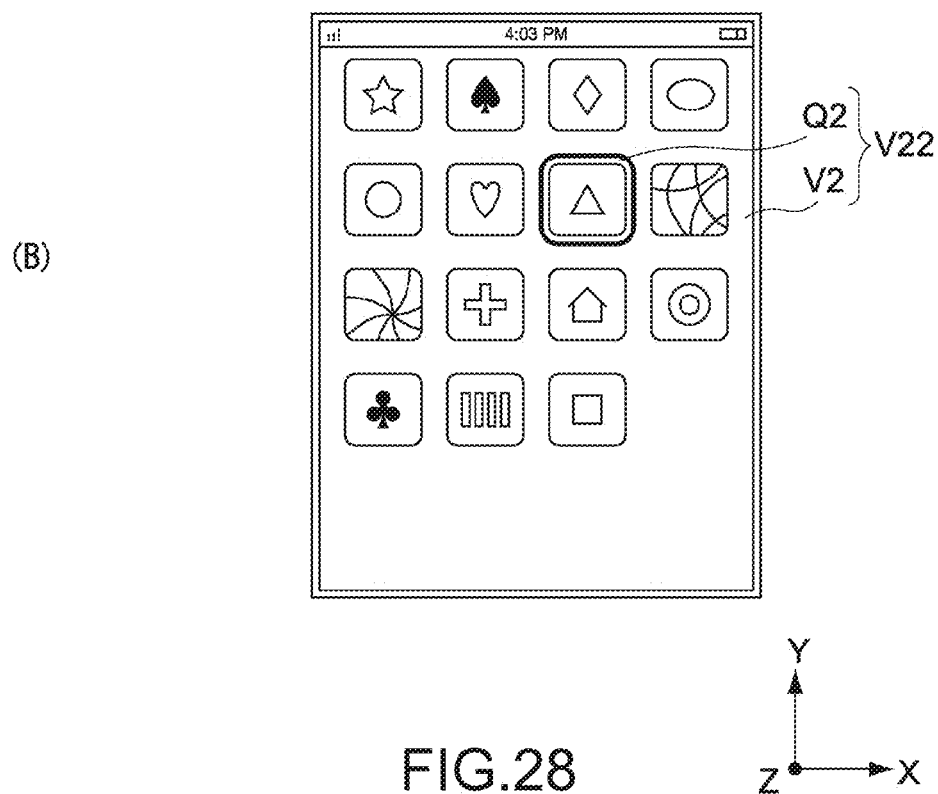
FIG.28

HEAD-MOUNTED DISPLAY

CROSS REFERENCES TO RELATED APPLICATIONS

The present application is a national stage of International Application No. PCT/JP2013/001199 filed on Feb. 28, 2013 and claims priority to Japanese Patent Application No. 2012-056382 filed on Mar. 13, 2012, the disclosure of which is incorporated herein by reference.

BACKGROUND

The present invention relates to a head-mounted display.

There is known a head-mounted display (HMD) that is mounted on the head of a user to be able to present images to the user via a display or the like placed in front of the eyes. In the HMD, display images are generally controlled according to press operations or the like on a button attached to the HMD or a dedicated input apparatus or the like connected to the HMD (see Patent Document 1).

Patent Document 1: Japanese Patent Application Laid-open No. 2008-070817

SUMMARY

Problem to be Solved by the Invention

However, when the input operations are performed by the use of the dedicated input apparatus or the like, it is necessary to carry the input apparatus or the like together with the HMD, which is disadvantageous in terms of portability. Further, when the HMD is provided with the button or the like as the input apparatus, a variety of input operations is limited by the number of buttons or the like that can be provided. At the same time, the occupation area of the buttons or the like increases, which can affect the design. In addition, when the user who wears the HMD performs an input operation, the user cannot view the input apparatus attached to the HMD, and hence there is a possibility that the user performs an erroneous operation.

In the above-mentioned circumstances, it is an object of the present technology to provide a head-mounted display excellent in portability and operability.

Means for Solving the Problem

In order to achieve the above-mentioned object, a head-mounted display according to an embodiment of the present technology includes a main body and an input operation section.

The main body includes a display section configured to present an image to a user and is configured to be mountable on a head of the user.

The input operation section includes a first detection element that extends in a first axis direction and is provided in the main body and electrostatically detects an operation position in the first axis direction, and a first guide section that guides an input operation of the user along the first axis direction on the first detection element, and controls the image.

In the head-mounted display, the first detection element of the input operation section is provided in the main body, and hence an additional input apparatus or the like is unnecessary, which can enhance the portability. Further, the input operation section includes the first guide section, and hence the user can smoothly perform an input operation even if the user cannot view the first detection element, which can enhance the operability.

The first guide section may include at least one ridge provided on the first detection element along the first axis direction.

With this, the first guide section enables the user to recognize the position of the first detection element and the first axis direction by sensing the ridge by touch.

For example, the first guide section may include a first surface that extends along the first axis direction, and two second surfaces that project from the first surface and extend along the first axis direction while sandwiching the first surface therebetween, and the ridge may include two ridges each formed at a boundary between the first surface and each of the two second surfaces.

Alternatively, the first guide section may include a first surface that extends along the first axis direction, and two second surfaces that are recessed from the first surface and extend along the first axis direction while sandwiching the first surface therebetween, and the ridge may include two ridges each formed at a boundary between the first surface and each of the two second surfaces.

The first guide section includes a first surface and second surfaces each of which extends in the first axis direction. Steps are formed at boundaries between them. With this configuration, two ridges that can be sensed by touch are formed in the steps and it is possible to cause the user to recognize the position of the first detection element and the first axis direction. In addition, also with structures of grooves, protrusions, or the like formed by the first surface and the second surfaces, it is possible to guide an input operation along the first axis direction.

The first guide section may include a plurality of first surfaces that are arranged along the first axis direction, and a plurality of second surfaces that project from the plurality of first surfaces and are arranged alternately with the plurality of first surfaces along the first axis direction, and the first guide section may include a plurality of ridges each formed at a boundary between each of the plurality of second surfaces and each of the plurality of first surfaces.

In the first guide section, a plurality of ridges are arranged along the first axis direction. Thus, it is possible to cause the user to recognize the first axis direction being an arrangement direction by sensing the plurality of ridges by touch. In addition, it is also possible to cause the user to know a relative movement distance in an input operation on the first detection element by causing the user to recognize arrangement intervals of the plurality of ridges.

The main body may include a temple section that is placed on a temporal region of the user, and the first detection element may be disposed on the temple section.

In addition, the temple section may include an edge section that extends in the first axis direction, the first detection element may be provided along the edge section, and the first guide section may include the edge section.

With this, it is possible to provide the first detection element, using an elongated configuration of the temple section. Further, by using the edge section of the temple section as the first guide section, it is possible to cause the user to recognize the position of the first detection element and the first axis direction without additionally providing the first guide section.

The display section may include a plate-like optical member that displays the image, the main body may include a rim section that supports a periphery of the optical member, and the first detection element may be disposed on the rim section.

Further, the display section may include a plate-like optical member that displays the image, and the first detection element may be disposed on the optical member.

With this, using the configuration of the rim section or the optical member, the first detection element can be provided.

The input operation section may further include a control unit that calculates a coordinate position in the image, which corresponds to the operation position, and controls, based on the coordinate position, a movement of a pointer displayed on the image.

With the control unit, it is possible to move the pointer displayed on the image presented to the user depending on a position on the first detection element and a movement along the first axis direction.

In addition, the control unit may execute a process based on the coordinate position, generate an image signal corresponding to the process result, and output the image signal to the display section, and the input operation section may further include a switch that is configured to be pressable and outputs a press signal for determining execution of the process to the control unit.

With this, the user can select a desired GUI (designation item), an icon, or the like on the image presented by the HMD and it is possible to determinate execution of a process assigned to it.

The input operation section may further include a plurality of spacers that are provided to form a space between the main body and the first detection element, and the switch may be provided in the space and configured to be pressable through the first detection element.

With this, it becomes easy to determine the execution of the process by a push-in operation on the first detection element.

The switch may include at least one protrusion that extends along the first axis direction on the first detection element, and the first guide section may include a ridge formed in the protrusion.

With this, it is possible to commonly form the first guide section and the switch and to provide a simple, space-saving configuration.

The first detection element may include a capacitive sensor that detects a change in capacitance with respect to the user that performs an input operation.

The input operation section may further include a second detection element that extends in a second axis direction different from the first axis direction and are provided in the main body and detects an operation position in the second axis direction, and a second guide section that guides an input operation of the user along the second axis direction on the second detection element.

With this, the HMD can detect a two-dimensional operation position based on the operation position in the first and second axis directions. Thus, it is possible to move the pointer or the like on the image in a desired direction depending on a change in the operation position on the first and second detection elements.

Effect of the Invention

As described above, according to the present technology, it is possible to provide a head-mounted display excellent in portability and operability.

Additional features and advantages are described herein, and will be apparent from the following Detailed Description and the figures.

BRIEF DESCRIPTION OF THE FIGURES

FIG. 6 A view explaining a typical operation example of the head-mounted display according to the first embodiment of the present technology, in which (A) shows first and second detection elements and first and second guide sections on which a user is performing input operations and (B) shows an operation image presented to the user.

FIG. 12 A schematic perspective view showing a head-mounted display according to a fifth embodiment of the present technology.

FIG. 13 A schematic perspective view showing a head-mounted display according to a modified example of the fifth embodiment of the present technology.

FIG. 25 A view explaining a modified example of the embodiment of the present technology, in which (A) shows a state in which the user touches a first guide section with two fingers and widens a distance therebetween and (B) shows a state in which an operation image is enlarged in size at this time.

FIG. 26 A view explaining the modified example of the embodiment of the present technology, in which (A) shows a state in which the user touches the first guide section with the two fingers and narrows the distance therebetween and (B) shows a state in which an operation image is reduced in size at this time.

FIG. 27 A view explaining a modified example of the embodiment of the present technology, in which (A) shows a first detection element and a first guide section on which the user is performing an input operation and (B) shows an operation image presented to the user.

FIG. 28 A view explaining the modified example of the embodiment of the present technology, in which (A) shows the first detection element and the first guide section on which the user is performing an input operation and (B) shows an operation image presented to the user.

DETAILED DESCRIPTION

Hereinafter, embodiments of the present technology will be described with reference to the drawings.

<First Embodiment>
[Head-Mounted Display]

Figure 1:
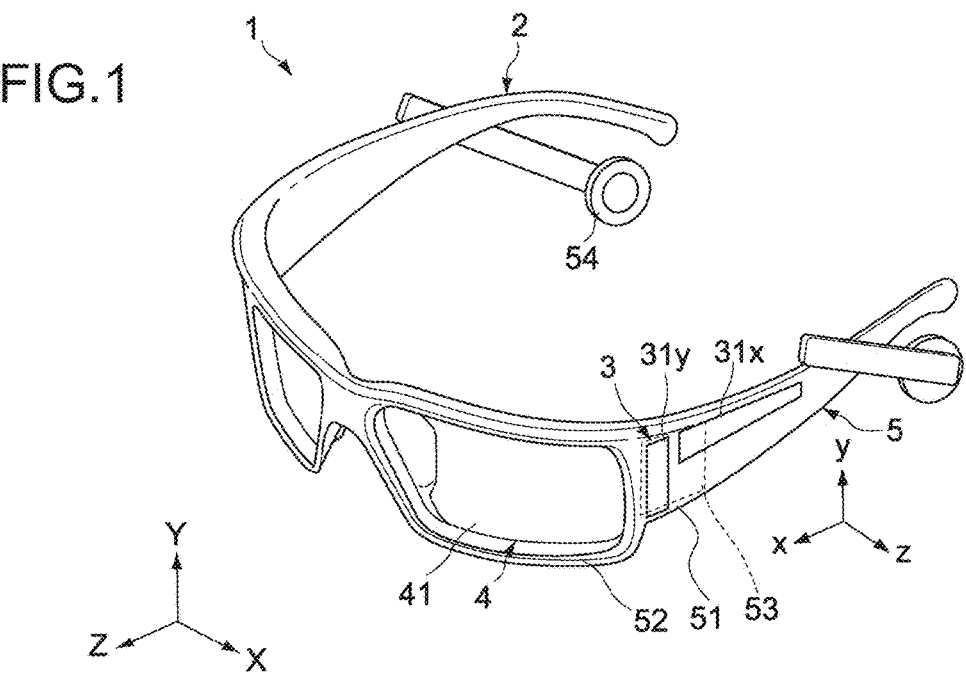
FIG. 1 A schematic perspective view showing a head-mounted display according to a first embodiment of the present technology.
Figure 2:
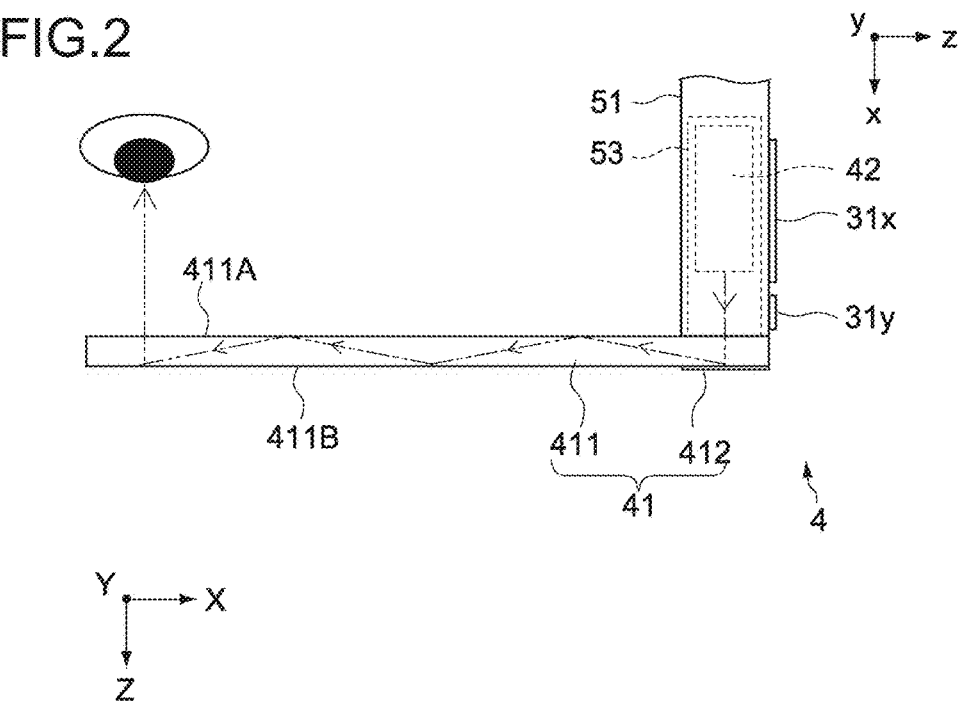
FIG. 2 A main-part plane view of the head-mounted display according to the first embodiment of the present technology.
Figure 3:
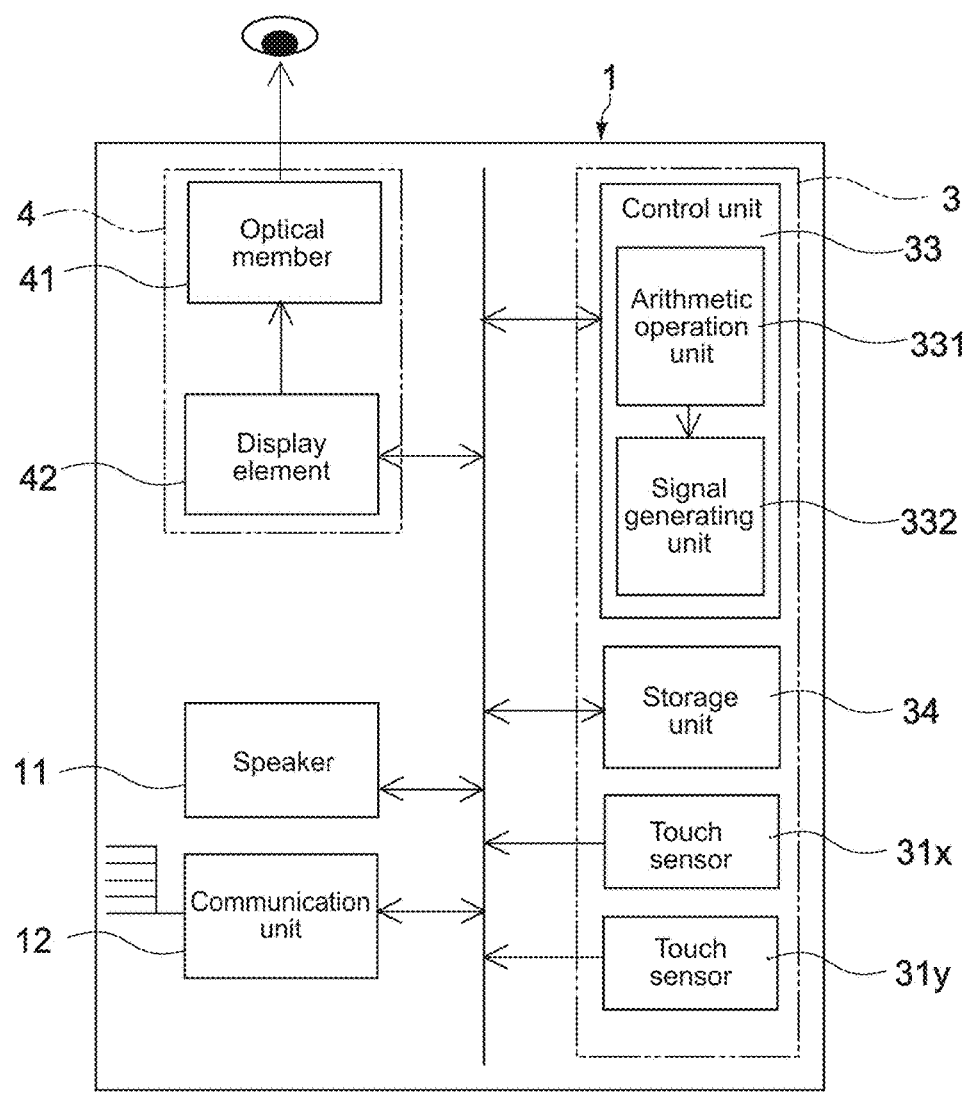
FIG. 3 A block diagram showing an internal configuration of the head-mounted display according to the first embodiment of the present technology.

FIGS. 1, 2, and 3 are schematic views showing a head-mounted display (HMD) according to an embodiment of the present technology. FIG. 1 is a perspective view, FIG. 2 is a main-part plane view, and FIG. 3 is a block diagram showing an internal configuration. An HMD 1 according to this embodiment includes a main body 2 and an input operation section 3. Note that an X-axis direction and a Y-axis direction in the figures indicate directions almost orthogonal to each other, the directions being parallel to a display surface on which an image is displayed to a user in this embodiment. A Z-axis direction indicates a direction orthogonal to the X-axis direction and the Y-axis direction.

The HMD 1 is, in this embodiment, configured as a see-through HMD. The HMD 1 has a shape like glasses as a whole. The HMD 1 is configured to be capable of presenting, to the user wearing it on the head, an image based on information input from the input operation section 3 while enabling the user to view an outside.

Note that the main body 2 of the HMD 1 includes, as will be described later, two display sections 4 configured corresponding to the left and right eyes. These display sections 4 have almost the same configuration, and hence, in the figures and descriptions below, common configurations of the two display sections 4 will be denoted by the same reference symbols.

[Main Body]
(Frame Section)

The main body 2 includes the display sections 4 and a frame section 5. The frame section 5 includes temple sections 51 that is placed on temporal regions of the user and rim sections 52 that support peripheries of optical members 41 of the display sections 4 to be described later. The frame section 5 is configured to be mountable on the head of the user. For example, the frame section 5 is formed of a material such as a synthetic resin and a metal and configured such that end portions of the temple sections 51 that are placed on the left and right temporal regions can be engaged with the ears of the user.

In this embodiment, for example, the temple sections 51 extend with the Z-axis direction being a longitudinal direction and are provided with the Y-axis direction being a width direction. Further, the rim sections 52 are, for example, provided almost orthogonal to the Z-axis direction.

Note that the temple sections 51 and the rim sections 52 include two temple sections 51 and two rim sections 52 configured corresponding to the left and right temporal regions and the left and right eyes of the user, respectively. The two temple sections 51 and the two rim sections 52 have almost the same configurations, respectively, and hence will be denoted by the same reference symbols in the figures and descriptions below.

In this embodiment, the frame section 5 includes a housing section 53 of an inner space formed to be capable of housing a display element 42 and the like of the display section 4. The housing section 53 is, for example, formed at a region adjacent to the rim section 52 of the temple section 51.

Further, the frame section 5 may also include earphones 54 movably attached to the temple sections 51. With this, the user can enjoy audio as well as images. In addition, the frame section 5 may also include nose pads (not shown) fixed between the two rim sections 52. This can improve the wearing feeling of the user.

(Display Sections)

FIG. 2 is a cross-sectional view schematically showing a configuration of the display section 4. The display section 4 includes the optical member 41 and the display element 42. In the display section 4, the display element 42 housed in the housing section 53 of the frame section 5 forms an image.

Then, the image light is guided into the optical member 41 and emitted to the eye of the user. In this manner, the image is presented to the user.

The display element 42 is, in this embodiment, for example, constituted of a liquid-crystal display (LCD) element. The display element 42 includes a plurality of pixels arranged in a matrix form. The display element 42 includes a light source (not shown) formed of a light-emitting diode (LED) or the like. The display element 42 modulates light incident from the light source according to an image control signal generated by the input operation section 3 for each pixel and outputs light for forming the image presented to the user. For example, the display element 42 may use a three-plate method of individually emitting image light beams corresponding to colors of R (red), G (green), and B (blue) or may use a single-plate method of emitting image light beams corresponding to the colors at the same time.

The display element 42 is, for example, configured to emit image light in the Z-axis direction. An optical system such as a lens may also be provided if necessary for causing the optical member 41 to emit image light, which is emitted from the display element 42, in a desired direction.

The optical member 41 includes, in this embodiment, a light guide plate 411 and a polarization element (hologram diffraction grating 412). The optical member 41 is attached to be opposed to the display element 42 in the Z-axis direction.

The light guide plate 411 presents a screen having a horizontal direction in the X-axis direction and a vertical direction in the Y-axis direction to the user via a display surface 411A from which image light is emitted. The light guide plate 411 is, for example, formed in a translucent plate shape including the display surface 411A having an XY-plane almost orthogonal to the Z-axis direction and an outer surface 411B opposed to the display surface 411A. Upon mounting, the light guide plate 411 is placed like a lens of glasses in front of the eye of the user, for example. A material of the light guide plate 411 can be appropriately employed in view of reflectance or the like. For example, a translucent material of a transparent plastic plate made of polycarbonate resin or polyethylene-terephthalate (PET), a glass plate, or a ceramic plate is employed.

The hologram diffraction grating 412 has, for example, a film-like structure formed of a photopolymer material or the like. The hologram diffraction grating 412 is provided on the outer surface 411B to be opposed to the display element 42 in the Z-axis direction. The hologram diffraction grating 412 is not a see-through type in this embodiment. However, the hologram diffraction grating 412 may be a see-through type.

The hologram diffraction grating 412 is capable of efficiently reflecting light having a particular wavelength bandwidth at an optimal diffraction angle. The hologram diffraction grating 412 is, for example, configured to diffract and reflect light having a particular wavelength bandwidth, which is emitted in the Z-axis direction, in a second direction such that the light can be totally reflected in the light guide plate 411, and to cause the light to be emitted from the display surface 411A toward the eye of the user. As the particular wavelength bandwidth, specifically, wavelength bandwidths corresponding to the colors of R (red), G (green), and B (blue) are selected. With this, image light beams corresponding to the colors, which are emitted from the display element 42, are propagated in the light guide plate 411 and emitted from the display surface 411A. By the image light beams of the colors entering the eye of the user, a predetermined image can be presented to the user. Note that, in FIG. 2, for the sake of convenience, only a light beam having a certain wavelength bandwidth is shown.

Further, a hologram diffraction grating separate from the hologram diffraction grating 412 may also be provided at a position on the outer surface 411B, which is opposed to the eye of the user. This make it easy for image light to be emitted from the display surface 411A to the eye of the user. In this case, for example, by configuring the hologram diffraction grating as a see-through hologram diffraction grating or the like, the configuration as the see-through HMD can be maintained.

[Input Operation Section]

The input operation section 3 includes, in this embodiment, a first touch sensor 31x (first detection element), a second touch sensor 31y (second detection element), a first guide section 32x, a second guide section 32y, a control unit 33, and a storage unit 34. The input operation section 3 is configured to control images presented to the user.

The first and second touch sensors 31x and 31y are constituted of one-dimensional electrostatic sensors that electrostatically detect contact positions or proximity positions of a finger of the user as a detection target, which are along different axis directions. In this embodiment, the first touch sensor 31x detects a position of the finger along the X-axis direction and the second touch sensor 31y detects a position of the finger along the Y-axis direction. Hereinafter, the first and second touch sensors 31x and 31y will be also simply referred to as touch sensors 31x and 31y and the first and second guide sections 32x and 32y will be also simply referred to as guide sections 32x and 32y.

In this embodiment, for example, the touch sensors 31x and 31y are provided to the temple section 51 placed on a left-hand side of the user upon mounting. However, the touch sensors 31x and 31y may be provided to the temple section 51 on a right-hand side or may be provided to the temple sections 51 on the both sides. The user performs an input operation on the HMD 1 by moving a finger on each of the touch sensors 31x and 31y. This enables the touch sensors 31x and 31y to move a pointer or the like on a two-dimensional display image in accordance with an operation position or a change thereof in an x-axis direction and a y-axis direction like a two-dimensional sensor.

Arrangement of the touch sensors 31x and 31y on the temple section 51 is not particularly limited. In this embodiment, the touch sensor 31x extends in the x-axis direction corresponding to the longitudinal direction (Z-axis direction) of the temple section 51 and the touch sensor 31y extends in the y-axis direction corresponding to the width direction (Y-axis direction) of the temple section 51. Further, the touch sensors 31x and 31y may be arranged orthogonal to each other. For example, as shown in FIG. 1, by arranging the touch sensors 31x and 31y adjacent to each other, the operability can be further enhanced.

Note that the "operation position" means an x-coordinate position and a y-coordinate position when the HMD 1 detects a contact of the finger or the like of the user with the touch sensor 31x or 31y.

The guide section 32x is disposed on the touch sensor 31x and the guide section 32y is disposed on the touch sensor 31y. In this embodiment, the guide sections 32x and 32y are provided on outer surface sides of the touch sensors 31x and 31y and the both are arranged such that the user can touch the guide sections 32x and 32y when performing an input operation on the touch sensor 31x or 31y.

Figure 4:
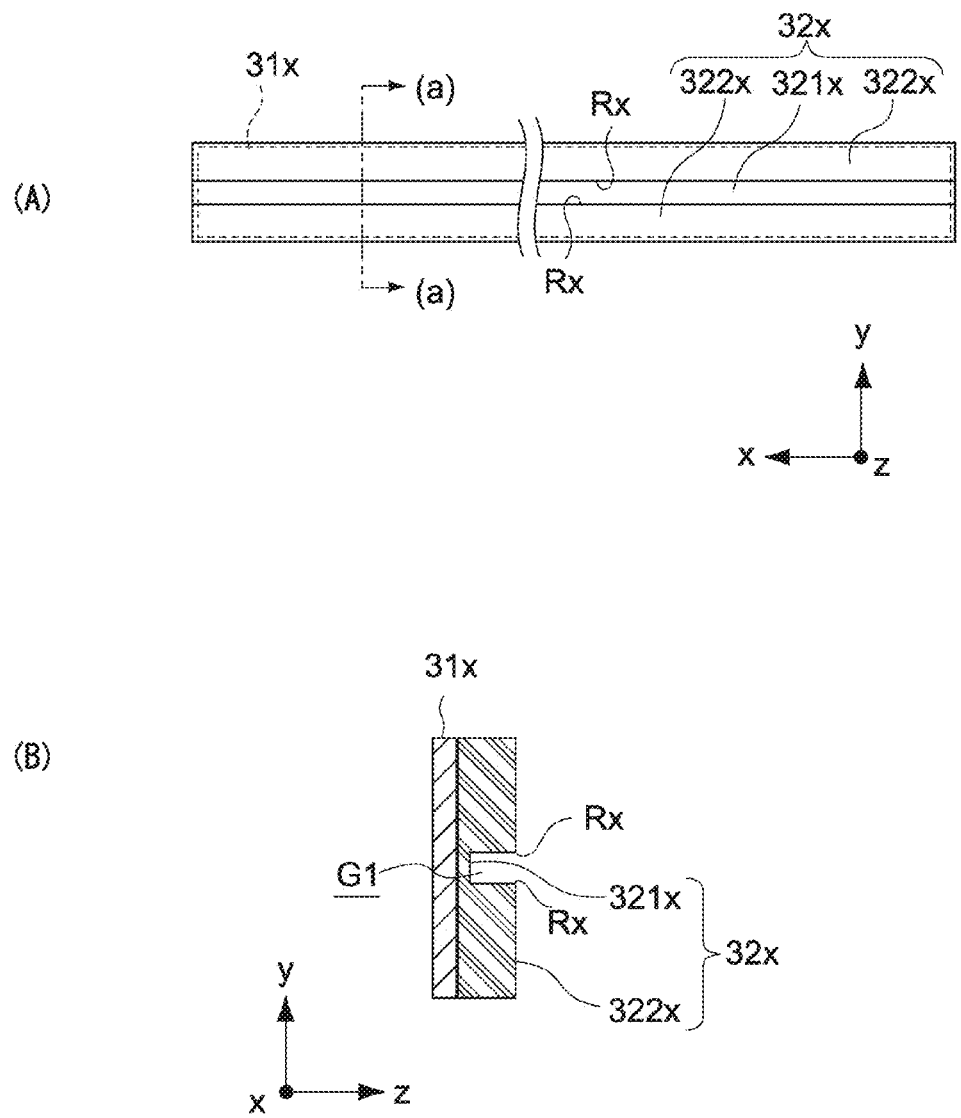
FIG. 4 A schematic view showing a first guide section of the head-mounted display according to the first embodiment of the present technology, in which (A) is a plane view and (B) is a cross-sectional view taken along the (a)-(a) direction of (A).

FIG. 4 is a schematic view showing a relationship between the first touch sensor 31x and the first guide section 32x, in which (A) is a plane view and (B) is a cross-sectional view taken along the (a)-(a) direction of (A). In the figures, the x-axis direction, the y-axis direction, and a z-axis direction correspond to the Z-axis direction, the Y-axis direction, and the X-axis direction, respectively. Further, as will be described later, the touch sensor $31y$ and the guide section $32y$ have configurations respectively corresponding to the touch sensor $31x$ and the guide section $32x$, and hence illustrations thereof are omitted.

The touch sensor $31x$ is formed in a thin plate shape having a longitudinal direction in the x-axis direction, a width direction in the y-axis direction, a thickness direction in the z-axis direction. Regarding a shape of the touch sensor $31x$, for example, a length in the x-axis direction can be appropriately set depending on the shape of the temple section $51$ and a width in the y-axis direction can be set to about 1 cm or less. Further, the touch sensor $31x$ may be curved along the temple section $51$.

Although not shown in the figures, the touch sensor $31x$ includes a plurality of first electrodes for x-position detection that are arranged at predetermined intervals in the x-axis direction. A length of the first electrode along the y-axis direction is set to be almost the same as the width of the touch sensor $31x$. The touch sensor $31x$ is driven by a driving circuit of the control unit $33$ to be described later.

The guide section $32x$ is formed of an electrical insulating material disposed on the touch sensor $31x$, for example, a plastic plate made of polycarbonate resin, polyethyleneterephthalate (PET), or the like, a glass plate, or a ceramic plate. The guide section $32x$ may be translucent or does not need to be translucent.

The guide section $32x$ is formed of a plate material having a longitudinal direction in the x-axis direction, a width direction in the y-axis direction, and a thickness direction in the z-axis direction and is fixed on the touch sensor $31x$. In this embodiment, a length and a width of the guide section $32x$ are set to be almost the same as the length and the width of the touch sensor $31x$. The guide section $32x$ may be fixed in contact with the touch sensor $31x$ or a predetermined space may be formed between the both.

The guide section $32x$ includes a first surface $321x$ and two second surfaces $322x$. The first surface $321x$ extends along the x-axis direction. The second surfaces $322x$ project from the first surface $321x$ and extend along the x-axis direction while sandwiching the first surface $321x$ therebetween. The first surface $321x$ corresponds to a bottom of a groove G1 formed at a center of a surface of the guide section $32x$ along the x-axis direction. A depth and a width of the groove G1 are not particularly limited and are set to appropriate values. Regarding a shape of the groove G1, it is not limited to the exemplary square groove as shown in the figure. A round groove may be employed with the first surface $321x$ being a curved surface.

In the guide section $32x$ configured in the above-mentioned manner, steps are formed between the first surface $321x$ and the two second surfaces $322x$. Two ridges Rx are formed along boundaries between them, that is, edges of the two second surfaces $322x$. These ridges Rx correspond to edges of the opening of the groove G1.

By sensing the two ridges Rx by touch, the user can recognize the x-axis direction and the position, the shape, and the like of the touch sensor $31x$ in the temple section $51$. With this, the two ridges Rx guide an input operation of the user on the touch sensor along the x-axis direction $31x$. Thus, the user can know the shape and the like of the touch sensor $31x$ by touching the ridges Rx without viewing the touch sensor $31x$ and the finger or the like that performs an input operation and can perform a desired input operation.

On the other hand, the touch sensor $31y$ is formed in a thin plate shape having a longitudinal direction in the y-axis direction, a width direction in the x-axis direction, and a thickness direction in the z-axis direction. Regarding a shape of the touch sensor $31y$, for example, a length in the y-axis direction can be appropriately set depending on the shape of the temple section $51$ and a width in the x-axis direction can be set to about 1 cm or less. Further, the touch sensor $31y$ may be curved along the temple section $51$.

Although not shown in the figures, the touch sensor $31y$ includes a plurality of second electrodes for y-position detection that are arranged at predetermined intervals in the y-axis direction. A length of the second electrode along the x-axis direction is set to be almost the same as the width of the touch sensor $31y$. The touch sensor $31y$ is driven by a driving circuit of the control unit $33$ to be described later.

The guide section $32y$ is formed of a plate material having a longitudinal direction in the y-axis direction, a width direction in the x-axis direction, and a thickness direction in the z-axis direction and is fixed on the touch sensor $31y$. In this embodiment, a length and a width of the guide section $32y$ are set to be almost the same as the length and the width of the touch sensor $31y$. As in the guide section $31x$, the guide section $32y$ includes a first surface $321y$ and second surfaces $322y$ and is formed of a plate material made of an electrical insulating material with two ridges Ry being formed between these surfaces. The first and second surfaces $321y$ and $322y$ have the same configurations as those of the first and second surfaces $321x$ and $322x$ of the guide section $32x$, and hence descriptions thereof are omitted here.

The control unit $33$ is typically constituted of a central processing unit (CPU) or a micro-processing unit (MPU). In this embodiment, the control unit $33$ includes an arithmetic operation unit $331$ and a signal generating unit $332$ and executes various functions according to programs stored in the storage unit $34$. The arithmetic operation unit $331$ performs predetermined arithmetic operation processing on electrical signals output from the touch sensors $31x$ and $31y$ and generates operation signals including information on an operation position of the user in contact with first sensor surfaces $311x$ and $311y$ and second sensor surfaces $312x$ and $312y$. The signal generating unit $332$ generates, based on these arithmetic operation results, an image control signal for causing the display element $42$ to display an image. Further, the control unit $33$ includes the driving circuits for driving the touch sensors $31x$ and $31y$. In this embodiment, the driving circuits are incorporated in the arithmetic operation unit $331$.

Specifically, the arithmetic operation unit $331$ calculates, based on signals output from the touch sensors $31x$ and $31y$, an operation position (x-coordinate position) of the finger on the first sensor surface $311x$ and the second sensor surface $312x$ and an operation position (y-coordinate position) of the finger on the first sensor surface $311y$ and the second sensor surface $312y$. With this, like a two-dimensional touch panel, xy-coordinates of the operation position can be calculated by the touch sensors $31x$ and $31y$. Further, a change in the xy-coordinates of the operation position over time is calculated by calculating differences from the x-coordinate position and the y-coordinate position that are obtained a predetermined time before. In addition, in this embodiment, when continuous operations of a contact and a non-contact (hereinafter, referred to as "tap operation") are detected at xy-coordinates of a predetermined operation position within a predetermined period of time, the arithmetic operation unit $331$ performs a particular process assigned to a GUI (designation item) corresponding to this coordinate position, which is displayed in an image presented to the user. The process results by the arithmetic operation unit 331 are transmitted to the signal generating unit 332.

In the signal generating unit 332, an image control signal to be output to the display element 42 is generated based on the process results transmitted from the arithmetic operation unit 331. According to such an image control signal, it is also possible to display, for example, an image with a pointer or the like based on the xy-coordinates of the operation position on the touch sensor 31x being overlapped on a menu selection image or the like showing GUIs or the like.

The image control signal generated by the signal generating unit 332 is output to each of the two display elements 42. Further, in the signal generating unit 332, image control signals corresponding to the left and right eyes may be generated. With this, a three-dimensional image can be presented to the user.

Although not shown in the figures, the HMD 1 includes an A/D convertor that converts detection signals (analog signals) output from the touch sensors 31x and 31y into digital signals and a D/A convertor that converts digital signals into analog signals.

The storage unit 34 is constituted of a random access memory (RAM), a read only memory (ROM), another semiconductor memory, or the like. The storage unit 34 stores calculated xy-coordinates of operation positions of the finger or the like of the user, programs used for various arithmetic operations by the control unit 33, and the like. For example, the ROM is constituted of a non-volatile memory and stores programs and set values for causing the control unit 33 to perform arithmetic operation processing such as calculation of xy-coordinates of an operation position. Further, for example, a non-volatile semiconductor memory enables the storage unit 34 to store programs and the like for performing functions assigned corresponding thereto. In addition, these programs stored in advance in the semiconductor memory or the like may be loaded into the RAM and executed by the arithmetic operation unit 331 of the control unit 33.

Note that the control unit 33 and the storage unit 34 may be housed in, for example, the housing section 53 of the frame section 5 or may be housed in another casing. If it is housed in the other casing, the control unit 33 is configured to be connectable to the touch sensors 31x and 31y, the display sections 4, and the like in a wired manner or a wireless manner.

In addition, the HMD 1 includes a speaker 11. The speaker 11 converts an electrical audio signal generated by the control unit 33 or the like into physical vibrations and provides the user with sounds via the earphones 54. Note that a configuration of the speaker 11 is not particularly limited.

Further, the HMD 1 may include a communication unit 12. With this, images to be presented to the user by the HMD 1 can be acquired from the Internet or the like via the communication unit 12.

Note that the housing section 53 may be configured to be capable of housing, for example, the above-mentioned control unit 33, storage unit 34, speaker 11, or communication unit 12 in addition to the display element 42.

[Operation Example of HMD]

Next, a basic operation example of the HMD 1 will be described.

Figure 5:
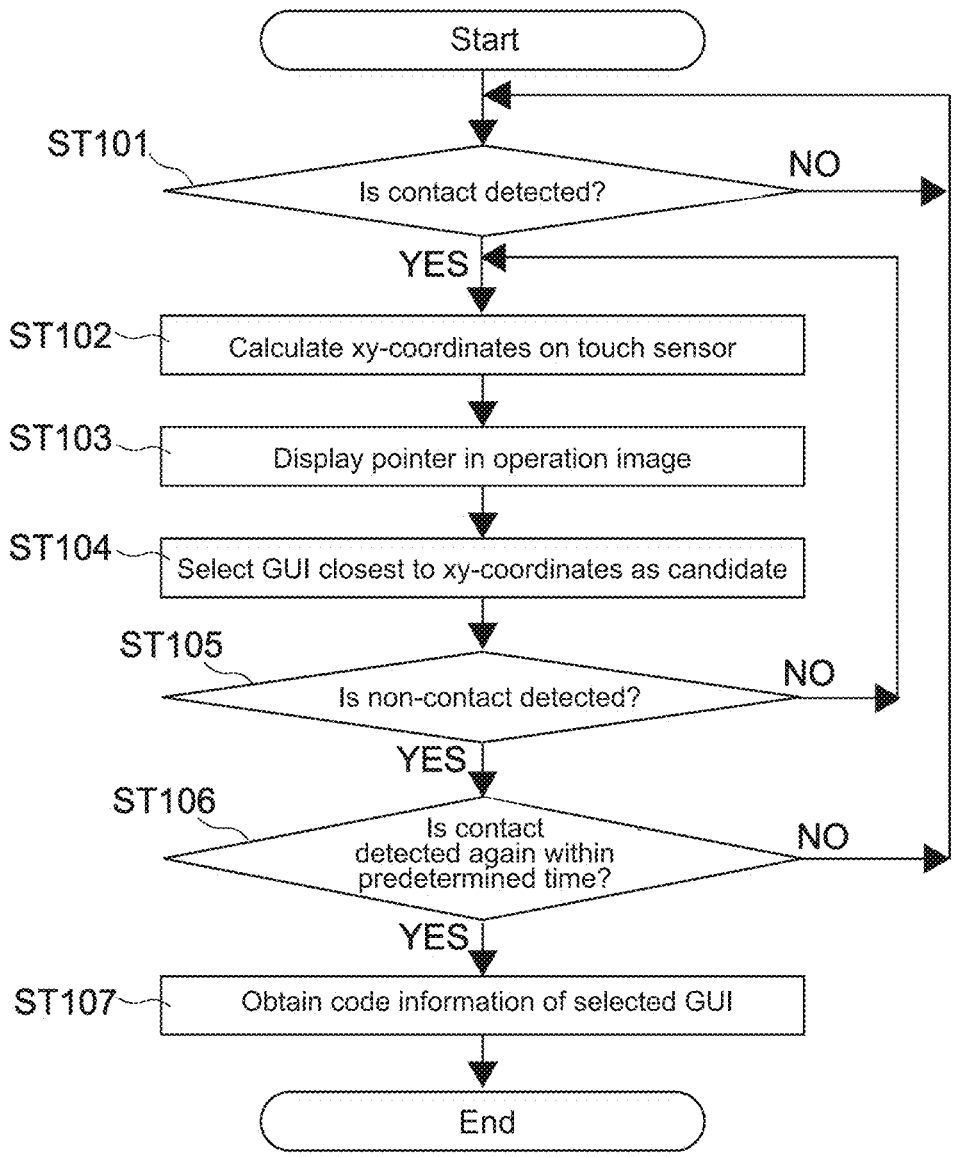
FIG. 5 A flowchart in an operation example of the head-mounted display (control unit) according to the first embodiment of the present technology.

FIG. 5 is a flowchart in an operation example of the HMD 1 (control unit 33). FIG. 6 is a view explaining a typical operation example of the HMD 1, in which (A) shows the touch sensors 31x and 31y on the temple section 51 on which the user is performing input operations and (B) shows an operation image to be presented to the user via the display surfaces 411A of the optical members 41. Here, the operation example of the HMD 1 when the user wears and activates the HMD 1 and performs tap operations at predetermined positions on the touch sensor 31x and the touch sensor 31y.

An image V1 showing, for example, a number of GUIs is displayed to the user who wears the activated HMD 1 via the display surface 411A (see (B) of FIG. 6). The image V1 is, for example, a menu selection image of various settings of the HMD 1. The GUIs correspond to a change to a silent mode of the HMD 1, volume control, reproduction and fast-forward of images, a change in a display mode of the pointer, and the like. Thus, the input operation section 3 is configured to be capable of changing the settings of the HMD 1 by the user selecting a particular one of the GUIs.

The touch sensors 31x and 31y output detection signals for detecting contacts of the finger or the like of the user with the guide sections 32x and 32y to the control unit 33. The arithmetic operation unit 331 of the control unit 33 determines a contact state based on the detection signals (Step ST101). By sensing the ridges Rx and Ry of the guide sections 32x and 32y by touch, the user can easily check the positions of the touch sensors 31x and 31y and touch the touch sensors 31x and 31y.

When detecting any contact of the guide sections 32x and 32y (YES in Step ST101), the arithmetic operation unit 331 of the control unit 33 calculates xy-coordinates of an operation position of the finger on the touch sensors 31x and 31y based on the detection signals (Step ST102). Operation signals about the xy-coordinates of the operation position that are calculated by the arithmetic operation unit 331 are output to the signal generating unit 332.

The signal generating unit 332 of the control unit 33 generates, based on the operation signals and an image signal of the image V1, a signal for controlling an operation image V10 with a pointer P indicating a position of a detection target being overlapped on the image V1. The image signal of the image V1 may be stored in advance in the storage unit 34. The display element 42 to which this image control signal is output emits image light of the operation image V10 to the optical members 41.

The optical member 41 guides the image light and causes the image light to be emitted from the display surface 411A of the light guide plate 411, to thereby present the operation image V10 to the user (Step ST103, (B) of FIG. 6).

When the finger of the user moves keeping the contact with at least one of the guide sections 32x and 32y (see arrow in (A) of FIG. 6), information on the xy-coordinates of the operation position that changes over time is obtained by the touch sensors 31x and 31y. The arithmetic operation unit 331 of the control unit 33 that obtains this information calculates a difference from the xy-coordinates of the operation position that are obtained a predetermined time before, to thereby calculate a change in the xy-coordinates of the operation position over time. Based on this result, the signal generating unit 332 can output a control signal for moving the pointer P to the display element 42. This enables the HMD 1 to move the pointer P in a display area of the image V1 in accordance with the movement of the finger of the user (see arrow in (B) of FIG. 6).

The control unit 33 selects a GUI closest to the calculated xy-coordinates of the operation position as a candidate (Step ST104). Correspondingly, the GUI selected as the candidate of the image V10 displayed by the HMD 1 may be changed in, for example, frame color, brightness, or luminance. Thus, the user can check the GUI as the selection candidate, viewing the image V10 displayed by the HMD 1.

Based on the outputs from the touch sensors 31x and 31y, the control unit 33 determines contact states of the guide sections 32x and 32y with the fingers (Step ST105). If it is determined that the control unit 33 keeps the contact state with at least one of the guide sections 32x and 32y (NO in Step ST105), xy-coordinates in the touch sensors 31x and 31y are calculated again and a selection candidate GUI is selected anew (Steps ST102 to 104).

If determining non-contacts in both of the guide sections 32x and 32y (YES in Step ST105), the control unit 33 determines a contact of the finger based on a signal from at least one of the touch sensors 31x and 31y again (Step ST106). If detecting the contact of the finger again within a predetermined period of time (YES in Step ST106), that is, if the user performs a tap operation on the selection candidate GUI, the control unit 33 determines this selection candidate GUI as the selected GUI. At this time, the control unit 33 obtains code information corresponding to this selected GUI, which is stored in the storage unit 34 (Step ST107).

If not detecting the contact in both of the guide sections 32x and 32y within the predetermined period of time again (NO in Step ST106), the control unit 33 determines that the GUI as the selection candidate is not selected. Then, the pointer P is removed from the operation image V10 of the HMD 1 and the screen returns to the image V1.

In addition, the control unit 33 performs, based on the obtained code information, a process corresponding to the selected GUI. This process is performed based on, for example, programs or the like stored in the storage unit 34. For example, if the function corresponding to the selected GUI is "change to silent mode," the control unit 33 can change the settings of the HMD 1 to the silent mode by performing the process based on the code information corresponding to this GUI.

If the code information obtained in Step ST107 is, for example, the volume control, the control unit 33 may generate an image control signal based on this code information and output it to the display element 42. With this, for example, a new operation image (not shown) on which a volume control bar or the like is overlapped is presented to the user who wears the HMD 1. If the obtained code information is, for example, the reproduction of images, the control unit 33 generates an image control signal based on this code information, such that thumbnail images or the like (not shown) for selecting video content to be reproduced are presented to the user.

As described above, the HMD 1 according to this embodiment includes the touch sensors 31x and 31y disposed on the temple section 51 of the main body 2, and hence does not need a dedicated input apparatus or the like. With this, even if the HMD 1 is used in a place where it is difficult to take out the input apparatus or the like, for example, a crowded train, it is possible to perform input operations on the HMD 1, which enhances the convenience. In addition, it becomes easy to carry the HMD 1.

Further, the HMD 1 is provided with the guide sections 32x and 32y on the touch sensors 31x and 31y, respectively. With this, without checking the touch sensors 31x and 31y and the finger or the like that performs input operations, it is possible to know the positions, the shape, and the like of the touch sensors 31x and 31y by touching the guide sections 32x and 32y. Thus, even when the user wears the HMD 1 and cannot view the touch sensors 31x and 31y, it is possible to easily perform a desired input operation, which can enhance the operability.

The entire surfaces of the touch sensors 31x and 31y of the HMD 1 according to this embodiment are configured as sensor surfaces. With this, the touch sensors 31x and 31y only need to have a width that can receive a contact of the finger of the user, and hence it is possible to configure the space-saving touch sensors 31x and 31y.

In addition, the HMD 1 is provided with the touch sensors 31x and 31y utilizing the configuration of the temple section 51 of the main body 2, and hence it is possible to realize the operability similar to that in a two-dimensional touch sensor having a panel shape or the like even with limited space.

Further, as a modified example of this embodiment, the following configuration may also be employed.

MODIFIED EXAMPLE

Figure 7:
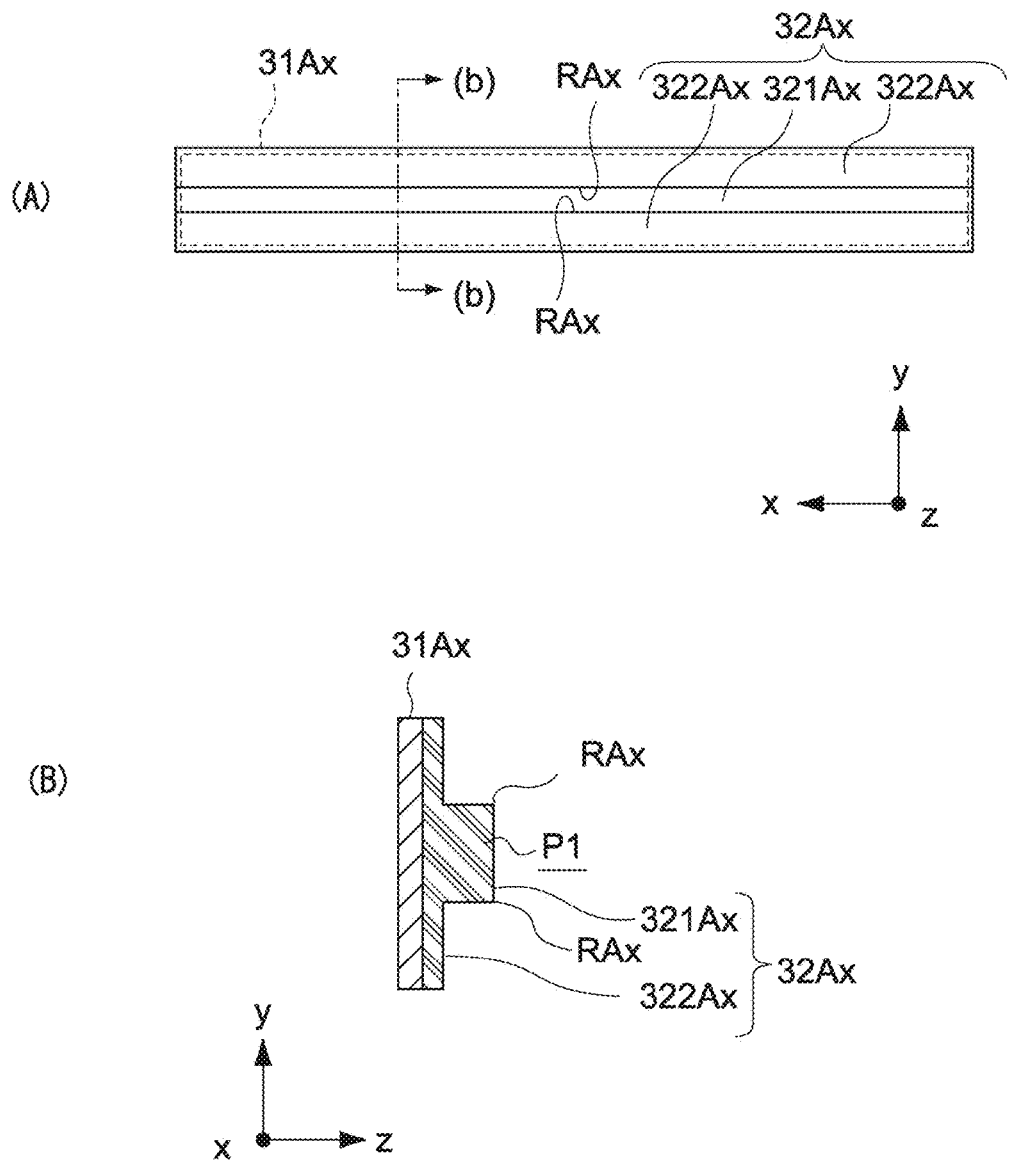
FIG. 7 A schematic view showing a first detection element and a first guide section according to a modified example of the first embodiment of the present technology, in which (A) shows a plane view and (B) shows a cross-sectional view taken along the (b)-(b) direction of (A).

FIG. 7 is a schematic view showing a modified example of the first touch sensor and the first guide section each of which extends along the x-axis direction, in which (A) shows a plane view and (B) shows a cross-sectional view taken along the (b)-(b) direction of (A). Note that a second touch sensor and a second guide section each of which extends along the y-axis direction have the same configurations as those of a touch sensor 31Ax and a guide section 32Ax shown in the figures, and hence illustrations and descriptions thereof will be omitted.

The guide section 32Ax shown in FIG. 7 includes a first surface 321Ax that extends along the x-axis direction and two second surfaces 322Ax that are recessed from the first surface 321Ax and extend along the x-axis direction while sandwiching the first surface 321Ax therebetween. The first surface 321Ax corresponds to a top surface of a protrusion P1 having a rectangular cross section that is formed at a center of the surface of the guide section 32Ax along the x-axis direction. With this, steps are formed between the first surface 321Ax and the two second surfaces 332Ax and two ridges RAx are formed along boundaries between these surfaces, that is, edges of the first surface 321Ax.

With this configuration, the user can perform an input operation along the two ridges RAx, RAy and side surfaces of the protrusion P1 or the like. Thus, the touch sensor 31Ax and the guide section 32Ax can guide a desired input operation of the user, which can enhance the operability.

<Second Embodiment>

Figure 8:
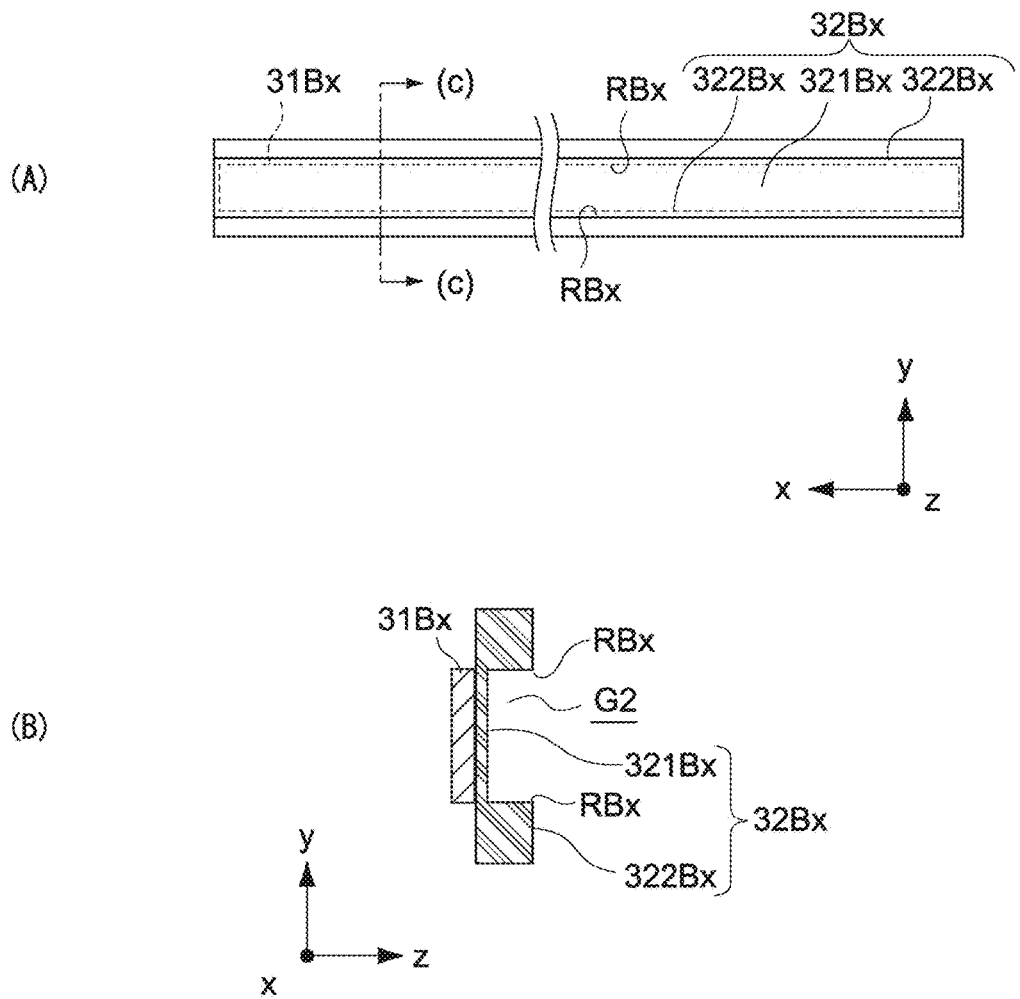
FIG. 8 A schematic view showing a first detection element and a first guide section according to a second embodiment of the present technology, in which (A) shows a plane view and (B) shows a cross-sectional view taken along the (c)-(c) direction of (A).

FIG. 8 is a schematic view showing a relationship between a first touch sensor and a first guide section each of which extends along the x-axis direction according to a second embodiment of the present technology, in which (A) shows a plane view and (B) shows a cross-sectional view taken along the (c)-(c) direction of (A). In this embodiment, descriptions of the same portions as the configurations and actions of the first embodiment will be omitted or simplified and portions different from those of the first embodiment will be mainly described. Note that a second touch sensor and a second guide section each of which extends along the y-axis direction have the same configurations as those of a touch sensor 31Bx and a guide section 32Bx shown in the figures, and hence illustrations and descriptions thereof will be omitted.

This embodiment is different from the first embodiment in that the way to provide the guide section 32Bx on the touch sensor 31Bx is different. Specifically, as in the first embodiment, the touch sensor 31Bx is formed in a thin plate shape having a longitudinal direction in the x-axis direction, a width direction in the y-axis direction, and a thickness direction in the z-axis direction. On the other hand, although the guide section 32Bx includes a first surface 321Bx that extends along the x-axis direction and two second surfaces 322Bx that project from the first surface 321Bx and extend along the x-axis direction while sandwiching the first surface 321Bx therebetween, a width of the first surface 321Bx in the y-axis direction is set to be almost the same as a width of the touch sensor 31Bx in the y-axis direction.

The first surface 321Bx corresponds to, as in the first embodiment, a bottom of a groove G2 formed at a center of the surface of the guide section 32Bx along the x-axis direction. Steps are formed between the first surface 321Bx and the two second surfaces 322Bx and two ridges RBx are formed along edges of the second surfaces 322Bx being boundaries between these surfaces.

The touch sensor 31Bx configured in the above-mentioned manner electrostatically detects an input operation of the user on the first surface 321Bx. With this, the user can perform a desired input operation along the x-axis direction by placing the finger on the first surface 321Bx in the groove G2 while sensing the two ridges RBx by touch and performing the input operation along the groove G2.

Note that the width of the touch sensor 31Bx and the width of the first surface 321Bx of the guide section 32Bx only need to be set such that the user can place the finger in the groove G2, and can be appropriately set depending on the specifications.

Also according to this embodiment, it is possible to guide an input operation of the user along the x-axis direction and the y-axis direction and to enhance the operability. In addition, the width of the touch sensor 31Bx according to this embodiment is set to the width of the first surface 321Bx of the guide section 32Bx, and hence it is possible to prevent an erroneous operation or the like due to an unintended contact of the finger with the second surfaces 322Bx of the guide section 32Bx. Thus, the guide section 32Bx can be used only for checking the position of the touch sensor 31Bx.

MODIFIED EXAMPLE

Figure 9:
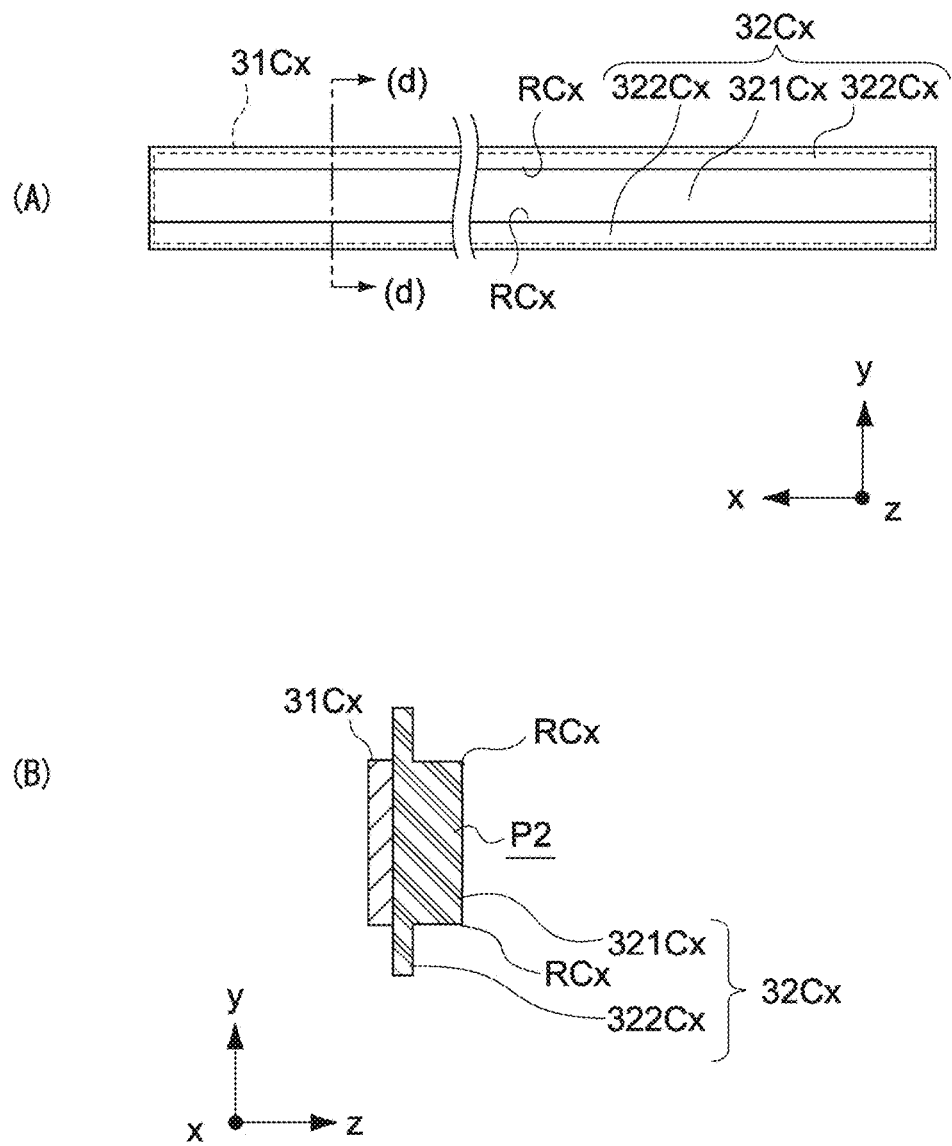
FIG. 9 A schematic view showing a first detection element and a first guide section according to a modified example of the second embodiment of the present technology, in which (A) shows a plane view and (B) shows a cross-sectional view taken along the (d)-(d) direction of (A).

FIG. 9 is a schematic view showing a modified example of the first touch sensor 31Bx and the first guide section 32Bx each of which extends along the x-axis direction, in which (A) shows a plane view and (B) shows a cross-sectional view taken along the (d)-(d) direction of (A). Note that a second touch sensor and a second guide section each of which extends along the y-axis direction have the same configurations as those of a touch sensor 31Cx and a guide section 32Cx shown in the figures, and hence illustrations and descriptions thereof will be omitted.

The guide section 32Cx shown in FIG. 9 includes a first surface 321Cx that extends along the x-axis direction and two second surfaces 322Cx that are recessed from the first surface 321Cx and extend along the x-axis direction while sandwiching the first surface 321Cx therebetween. The first surface 321Cx corresponds to a top surface of a protrusion P2 having a rectangular cross-section that is formed at a center of the surface of the guide section 32Cx along the x-axis direction. With this, steps are formed between the first surface 321Cx and the two second surfaces 332Cx and two ridges RCx are formed along boundaries between these surfaces, that is, edges of the first surface 321Cx. Further, a width of the touch sensor 31Cx is set corresponding to a width of the first surface 321Cx.

With this configuration, the user can perform an input operation along the two ridges RCx, the protrusion P2, the first surface 321Cx, and the like. Thus, the touch sensor 31Cx and the guide section 32Cx can guide a desired input operation of the user and enhance the operability. In addition, according to this modified example, the width of the touch sensor 31Cx is set to the width of the first surface 321Bx of the guide section 32Bx, and hence the same actions and effects as described above can be provided.

<Third Embodiment>

Figure 10:
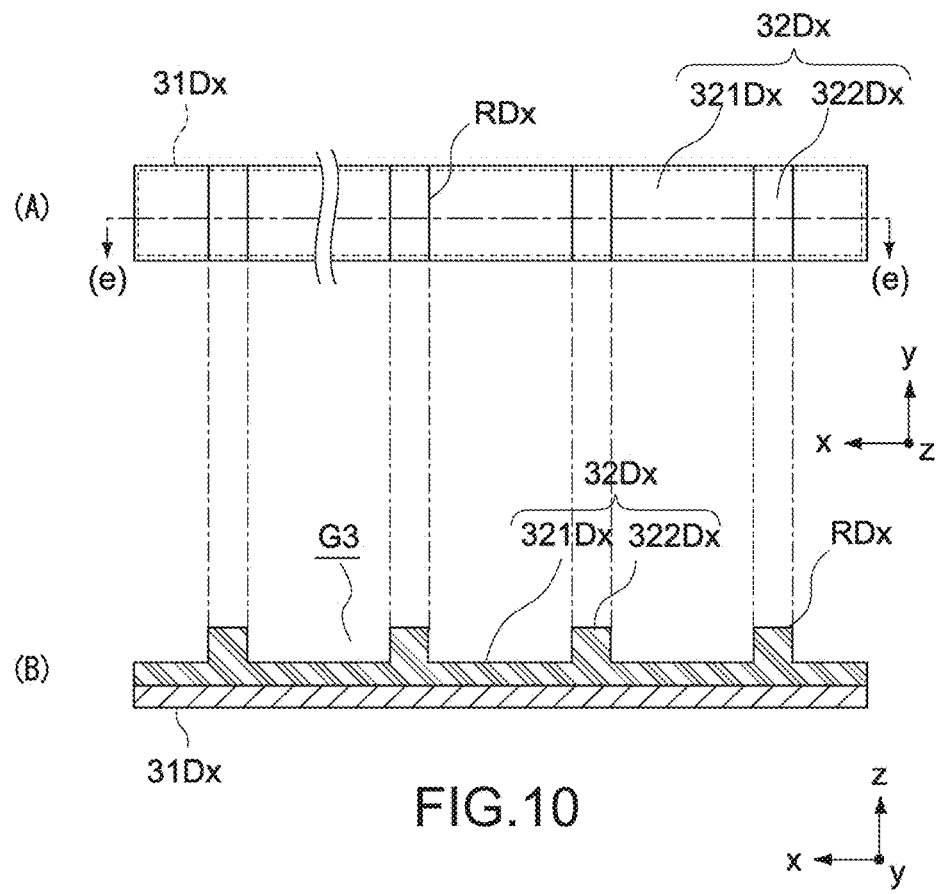
FIG. 10 A schematic view showing a first detection element and a first guide section according to a third embodiment of the present technology, in which (A) shows a plane view and (B) shows a cross-sectional view taken along the (e)-(e) direction of (A).

FIG. 10 is a schematic view showing a relationship between a first touch sensor and a first guide section each of which extends along the x-axis direction according to a third embodiment of the present technology, in which (A) shows a plane view and (B) shows a cross-sectional view taken along the (e)-(e) direction of (A). In this embodiment, descriptions of the same portions as the configurations and actions of the first embodiment will be omitted or simplified and portions different from those of the first embodiment will be mainly described. Note that a second touch sensor and a second guide section each of which extends along the y-axis direction have the same configurations as those of a touch sensor 31Dx and a guide section 32Dx shown in the figures, and hence illustrations and descriptions thereof will be omitted.

As in the first embodiment, the touch sensor 31Dx is formed in a thine plate shape having a longitudinal direction in the x-axis direction, a width direction in the y-axis direction, and a thickness direction in the z-axis direction. Although not shown in the figures, the touch sensor 31Dx includes a plurality of first electrodes for x-position detection that are arranged at predetermined intervals in the x-axis direction. A length of the first electrode in the y-axis direction is set to be almost the same as a width of the touch sensor 31Dx and the guide section 32Dx to be described later.

The guide section 32Dx includes a plurality of first surfaces 321Dx and a plurality of first surfaces 321Dx projecting in the z-axis direction with respect to the plurality of first surfaces 321Dx and has a configuration in which the first surfaces 321Dx and the second surfaces 322Dx are alternately arranged along the x-axis direction. Further, in this embodiment, the plurality of first surfaces 321Dx have almost the same length in the x-axis direction and the plurality of second surfaces 312Dx also have almost the same length in the x-axis direction. The first surfaces 321Dx correspond to bottoms of a plurality of grooves G3 periodically formed in the surface of the guide section 32Dx along the x-axis direction. Steps (concavities and convexities) are formed between the plurality of first surfaces 321Dx and the plurality of second surfaces 322Dx, and a plurality of ridges RDx are formed along boundaries between these surfaces, that is, edges of the second surfaces 322Dx.

In the touch sensor 31Dx according to this embodiment, the plurality of ridges RDx extending along the y-axis direction are arranged at predetermined intervals in the x-axis direction. With this, the user can recognize an operation direction on the touch sensor 31Dx along the x-axis direction by sensing the arrangement direction of the plurality of ridges RDx by touch.

Further, the plurality of ridges RDx are arranged at predetermined intervals in the x-axis direction, and hence the user touches the ridges RDx at the predetermined intervals by moving the finger in the arrangement direction of the ridges RDx and can know a relative movement amount on the touch sensor 31Dx. Thus, it becomes possible to further enhance the operability.

<Fourth Embodiment>

Figure 11:
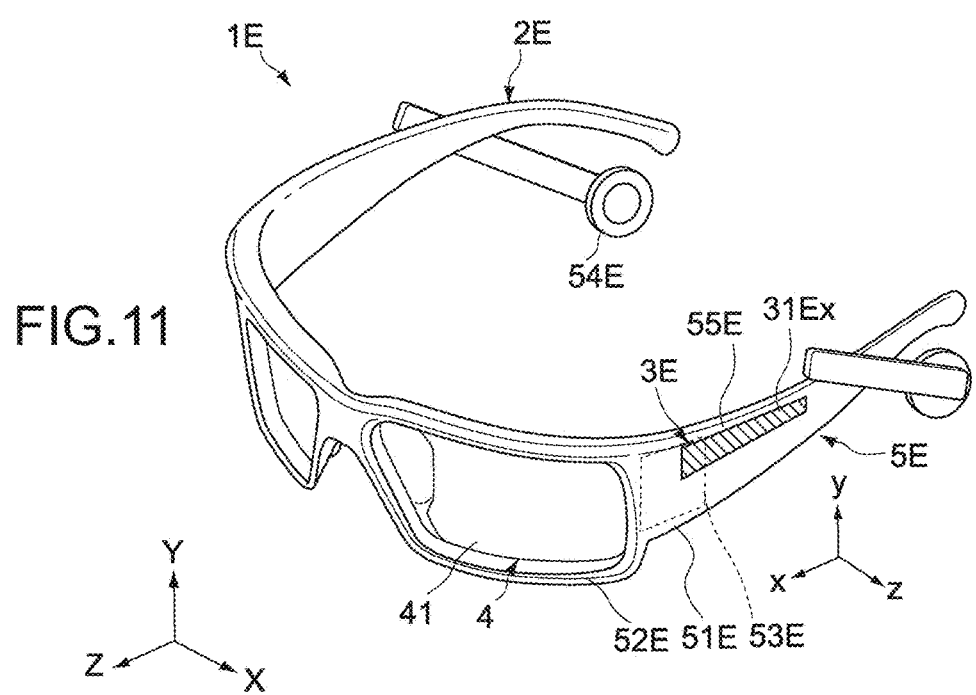
FIG. 11 A schematic perspective view showing a head-mounted display according to a fourth embodiment of the present technology.

FIG. 11 is a schematic perspective view showing an HMD according to a fourth embodiment of the present technology. In this embodiment, descriptions of the same portions as the configurations and actions of the first embodiment will be omitted or simplified and portions different from those of the first embodiment will be mainly described.

A temple section 51E of a main body 2E of an HMD 1E according to this embodiment includes an edge section 55E provided along the x-axis direction. A touch sensor 31Ex is provided along the edge section 55E of the temple section 51E.

In this embodiment, the edge section 55E constitutes a guide section that guides an input operation on the touch sensor 31Ex along the x-axis direction. With this, the user can recognize the position of the touch sensor 31Ex on the temple section 51E by sensing the edge section 55E by touch. Further, the edge section 55E of the temple section 51E is formed along the x-axis direction, and hence it is possible to recognize the x-axis direction by sensing the edge section 55E by touch and to easily perform an input operation on the touch sensor 31Ex along the x-axis direction. In addition, the guide section is constituted of the temple section 51E, and hence the HMD 1E can be provided with a more simple configuration.

<Fifth Embodiment>

FIG. 12 is a schematic perspective view showing the HMD according to a fifth embodiment of the present technology. In this embodiment, descriptions of the same portions as the configurations and actions of the first embodiment will be omitted or simplified and portions different from those of the first embodiment will be mainly described.

An HMD 10 according to this embodiment includes a main body 20 having the same configuration as that of the HMD 1 according to the first embodiment. This embodiment is different from the first embodiment in that a touch sensor 310y is disposed on a rim section 520 of a frame section 50. More specifically, the rim section 520 includes a rim side portion 521 that extends in the Y-axis direction and a rim upper portion 522 and a rim lower portion 523 each of which extends in the X-axis direction. The touch sensor 310y is disposed on the rim side portion 521 to extend in the Y-axis direction.

In this embodiment, the rim side portion 521 constitutes a guide section 320y that guides an input operation on the touch sensor 310y along the Y-axis direction. With this, the user can recognize the position of the touch sensor 310y by sensing the rim side portion 521 by touch. Further, the rim side portion 521 is formed along the Y-axis direction, and hence it is possible to recognize the Y-axis direction by sensing the rim side portion 521 by touch and to easily perform an input operation on the touch sensor 310y along the Y-axis direction. In addition, the guide section 320y is constituted of the rim side portion 521, and hence the HMD 10 can be provided with a more simple configuration.

In the HMD 10, the touch sensor 310y is disposed on the rim side portion 521 of the main body 2, and hence an additional input apparatus or the like is unnecessary, which can enhance the portability. Further, the HMD 10 according to this embodiment detects only a Y-coordinate position with the touch sensor 310y. With this, for example, if the HMD 10 is an image reproduction apparatus or the like that does not require complicated operations, sufficient operability can be exerted and a configuration of an input operation section 30 can be simple. Thus, it is possible to realize a cost reduction and an enhancement of the productivity.

Note that the positions of the touch sensor and the guide section according to this embodiment are not limited to those as described above and the following configurations may also be employed.

MODIFIED EXAMPLE

FIGS. 13 to 17 are schematic perspective views showing modified examples of the HMD 10 according to this embodiment.

In an HMD 10A shown in FIG. 13, a touch sensor 310Ax and a guide section 320Ax are disposed on a rim upper portion 522. The touch sensor 310Ax is disposed on the rim upper portion 522 to extend in the X-axis direction. The touch sensor 310Ax has almost the same configuration as that of the touch sensor 31x or the like and is configured to be capable of detecting an input operation (x-coordinate) of the user along the X-axis direction. On the other hand, the rim upper portion 522 constitutes the guide section 320Ax that guides an input operation on the touch sensor 310Ax along the X-axis direction. With this, the user can recognize the position of the touch sensor 310Ax by sensing the rim upper portion 522 by touch.

Figure 14:
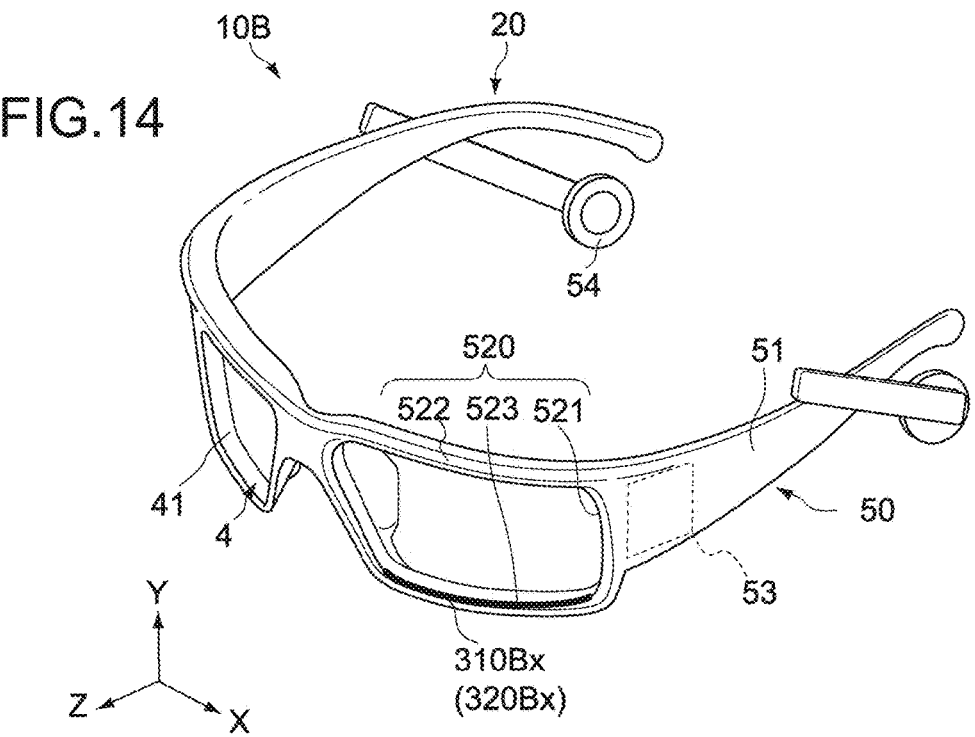
FIG. 14 A schematic perspective view showing a head-mounted display according to a modified example of the fifth embodiment of the present technology.

In an HMD 10B shown in FIG. 14, a touch sensor 310Bx and a guide section 320Bx are disposed on a rim lower portion 523. The touch sensor 310Bx is disposed on the rim lower portion 523 to extend in the X-axis direction. The touch sensor 310Bx has almost the same configuration as that of the touch sensor 31x or the like and is configured to be capable of detecting an input operation (x-coordinate) of the user along the X-axis direction. On the other hand, the rim lower portion 523 constitutes the guide section 320Bx that guides an input operation on the touch sensor 310Bx along the X-axis direction. With this, the user can recognize the position of the touch sensor 310Bx by sensing the rim lower portion 523 by touch.

Also with the HMDs 10A and 10B, the portability and the operability can be enhanced. Further, the HMD 10A or 10B includes the one touch sensor 310Ax or 310Bx, and hence it is possible to realize a cost reduction and an enhancement of the productivity.

Figure 15:
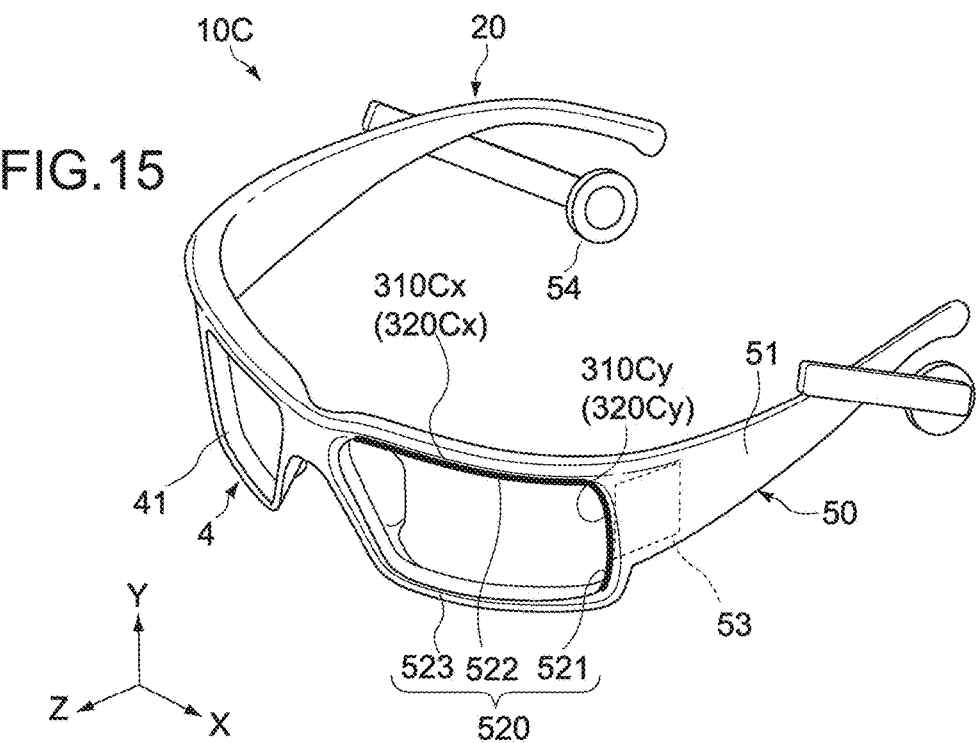
FIG. 15 A schematic perspective view showing a head-mounted display according to a modified example of the fifth embodiment of the present technology.

An HMD 10C shown in FIG. 15 includes touch sensors 310Cx and 310Cy and guide sections 320Cx and 320Cy. The touch sensor 310Cx is disposed on a rim upper portion 522 to extend in the X-axis direction. The touch sensor 310Cx has almost the same configuration as that of the touch sensor 31x or the like and is configured to be capable of detecting an input operation (x-coordinate) of the user along the X-axis direction. Further, the touch sensor 310Cy is disposed on a rim side portion 521 to extend in the Y-axis direction. The touch sensor 310Cy has almost the same configuration as that of the touch sensor 31y or the like and is configured to be capable of detecting an input operation (y-coordinate) of the user along the Y-axis direction.

The rim upper portion 522 constitutes the guide section 320Cx that guides an input operation on the touch sensor 310Cx along the X-axis direction. With this, the user can recognize the position of the touch sensor 310Cx by sensing the rim upper portion 522 by touch. Further, the rim side portion 521 constitutes the guide section 320Cy that guides an input operation on the touch sensor 310Cy along the Y-axis direction. With this, the user can recognize the position of the touch sensor 310Cy by sensing the rim side portion 521 by touch.

Figure 16:
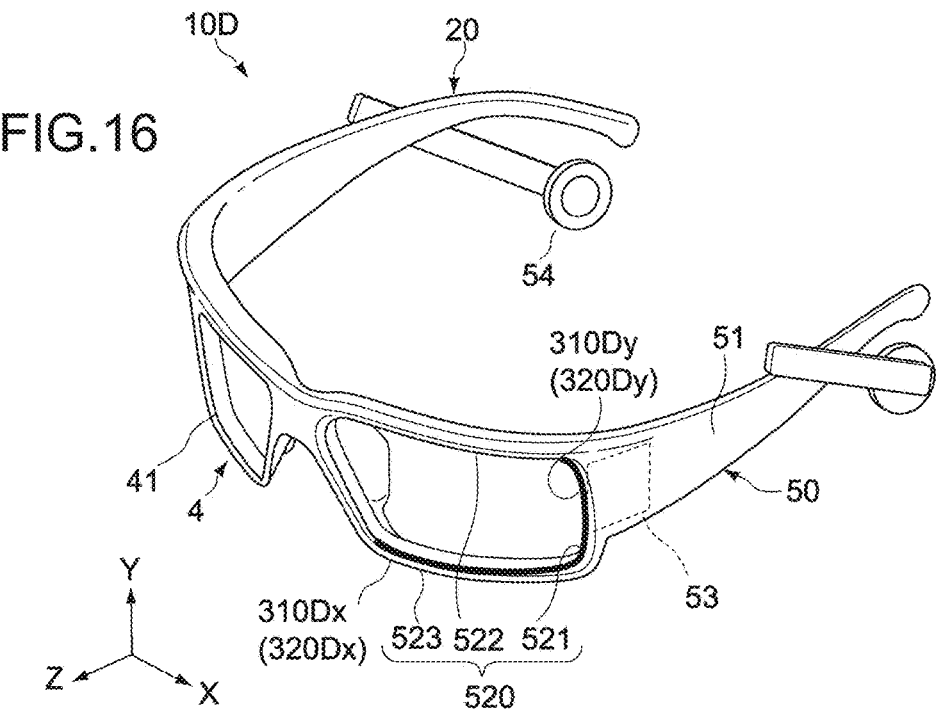
FIG. 16 A schematic perspective view showing a head-mounted display according to a modified example of the fifth embodiment of the present technology.

An HMD 10D shown in FIG. 16 includes touch sensors 310Dx and 310Dy and the guide sections 320Dx and 320Dy. The touch sensor 310Dx is disposed on a rim lower portion 523 to extend in the X-axis direction. The touch sensor 310Dx has almost the same configuration as that of the touch sensor 31x or the like and is configured to be capable of detecting an input operation (x-coordinate) of the user along the X-axis direction. Further, the touch sensor 310Dy is disposed on a rim side portion 521 to extend in the Y-axis direction. The touch sensor 310Dy has almost the same configuration as that of the touch sensor 31y or the like and is configured to be capable of detecting an input operation (y-coordinate) of the user along the Y-axis direction.

The rim lower portion 523 constitutes the guide section 320Dx that guides an input operation on the touch sensor 310Dx along the X-axis direction. With this, the user can recognize the position of the touch sensor 310Dx by sensing the rim lower portion 523 by touch. Further, the rim side portion 521 constitutes the guide section 320Dy that guides an input operation on the touch sensor 310Dy along the Y-axis direction. With this, the user can recognize the position of the touch sensor 310Dy by sensing the rim side portion 521 by touch.

Also with the HMDs 10C and 10D, the portability can be enhanced. Further, like a two-dimensional sensor, it becomes possible to move a pointer or the like on a two-dimensional display image in accordance with an operation position in the X-axis direction and the Y-axis direction, and hence it becomes possible to further enhance the operability.

Figure 17:
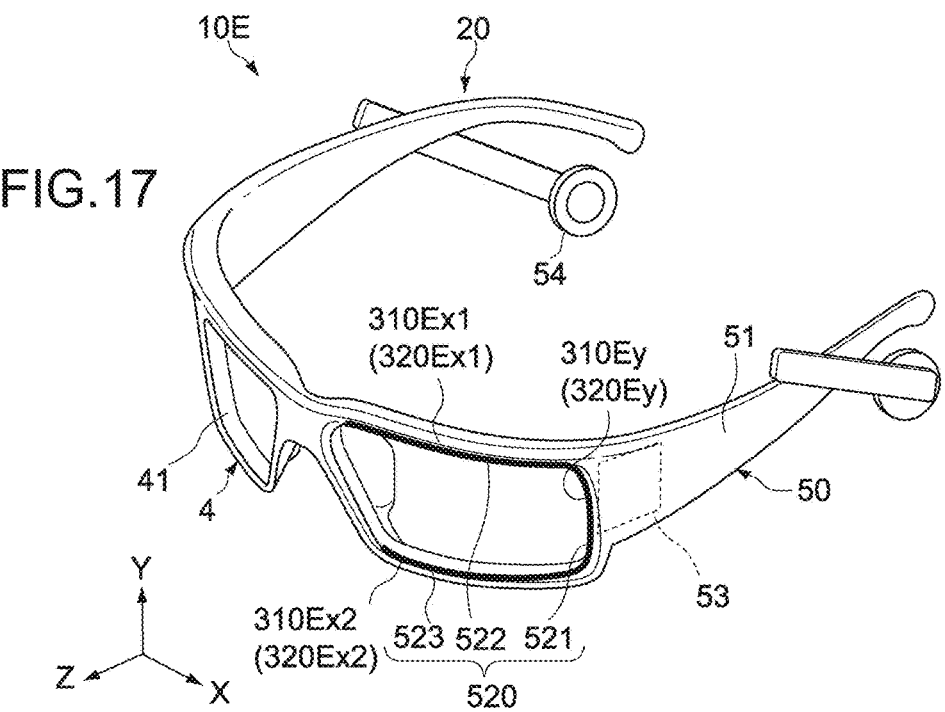
FIG. 17 A schematic perspective view showing a head-mounted display according to a modified example of the fifth embodiment of the present technology.

An HMD 10E shown in FIG. 17 includes touch sensors 310Ex1, 310Ex2, and 310Ey and guide sections 320Ex1, 320Ex2, and 320Ey. The touch sensors 310Ex1 and 310Ex2 are disposed on a rim upper portion 522 and a rim lower portion 523 to extend in the X-axis direction. The touch sensors 310Ex1 and 310Ex2 each have almost the same configuration as that of the touch sensor 31x or the like and are configured to be capable of detecting an input operation (x-coordinate) of the user along the X-axis direction. Further, the touch sensor 310Ey is disposed on a rim side portion 521 to extend in the Y-axis direction. The touch sensor 310Ey has almost the same configuration as that of the touch sensor 31y or the like and is configured to be capable of detecting an input operation (y-coordinate) of the user along the Y-axis direction.

The rim upper portion 422 and the rim lower portion 523 constitute the guide sections 320Ex1 and 320Ex2 that guide input operations on the touch sensors 310Ex1 and 310Ex2 in the X-axis direction, respectively. With this, the user can recognize the positions of the touch sensors 310Ex1 and 310Ex2 by sensing the rim upper portion 522 and the rim lower portion 523 by touch. Further, the rim side portion 521 constitutes the guide section 320Ey that guides an input operation on the touch sensor 310Ey along the Y-axis direction. With this, the user can recognize the position of the touch sensor 310Ey by sensing the rim side portion 521 by touch.

The HMD 10E having the above-mentioned configuration includes the touch sensors 310Ex1 and 310Ex2 that output detection signals about operation positions in the X-axis direction. Therefore, also with either one of these sensors, it is possible to detect operation positions of the user along the X-axis direction. With this, these sensors can be selected depending on a finger to be used or an operation type, and hence it is possible to further enhance the operability of the user.

<Sixth Embodiment>

Figure 18:
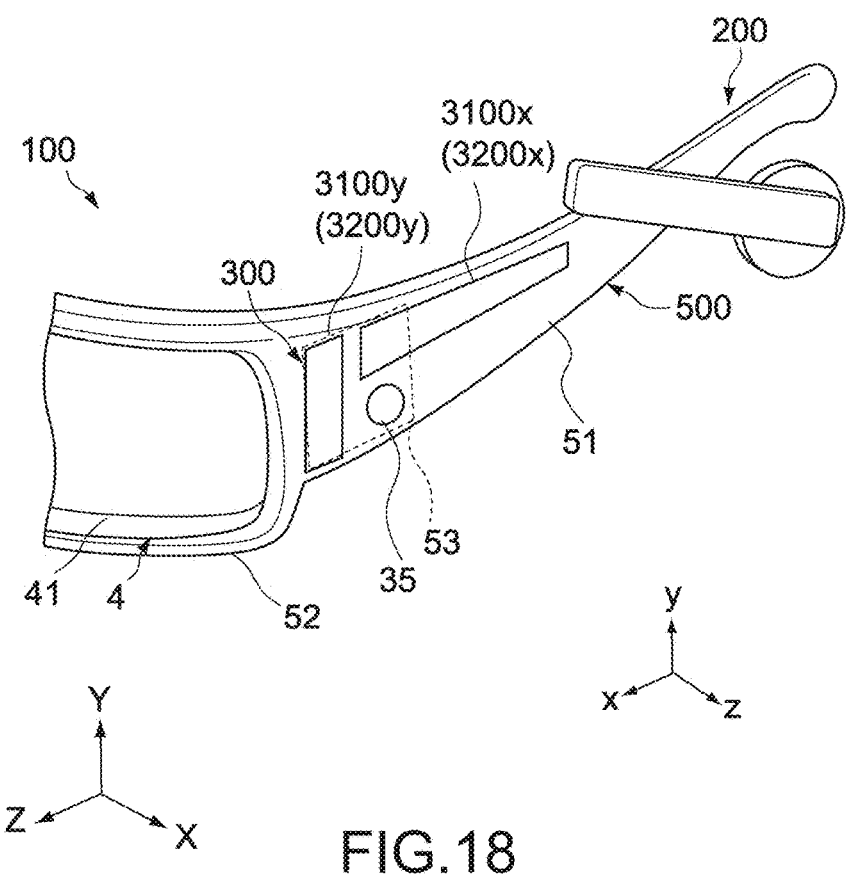
FIG. 18 A main-part schematic perspective view showing a head-mounted display according to a sixth embodiment of the present technology.
Figure 19:
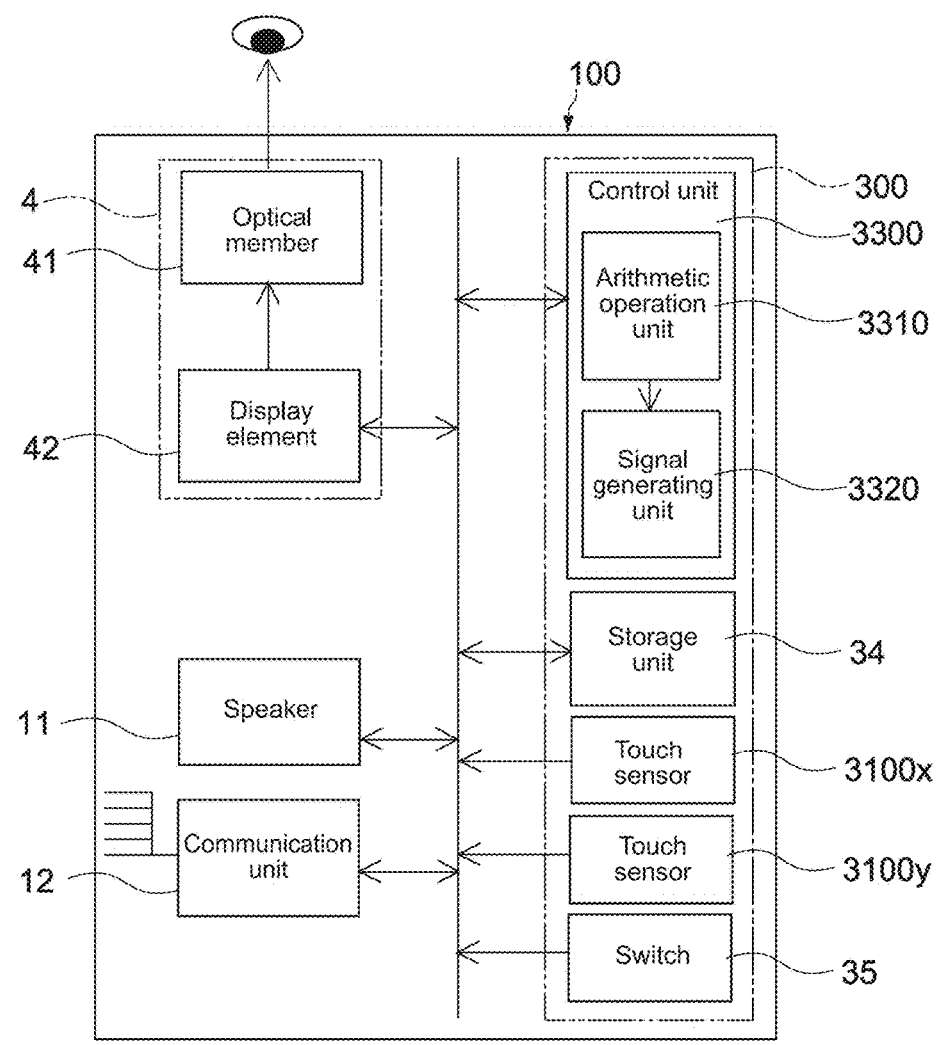
FIG. 19 A block diagram showing an internal configuration of the head-mounted display according to the sixth embodiment of the present technology.

FIGS. 18 and 19 are schematic views showing an HMD according to a sixth embodiment of the present technology. FIG. 18 is a main-part perspective view and FIG. 19 is a block diagram showing an internal configuration. In this embodiment, descriptions of the same portions as the configurations and actions of the first embodiment will be omitted or simplified and portions different from those of the first embodiment will be mainly described.

An input operation section 300 of an HMD 100 according to this embodiment is different from the first embodiment in that it includes a switch 35 configured to be pressable. Specifically, the switch 35 outputs a press signal for determining execution of a process corresponding to a GUI or the like selected according to input operations on touch sensors 3100x and 3100y, to a control unit 3300.

The switch 35 is, for example, formed of one button pressable in the z-axis direction. The position of the switch 35 is not particularly limited and can be appropriately set in view of the functions, the apparatus configuration, and the like of the HMD 100. For example, the switch 35 can be provided near the touch sensors 3100x and 3100y on a temple section 51.

In this embodiment, the touch sensors 3100x and 3100y and guide sections 3200x and 3200y can be configured in almost the same manner as the touch sensors 31x and 31y and the guide sections 32x and 32y according to the first embodiment. However, they are not limited thereto. For example, the touch sensors 3100x and 3100y and guide sections 3200x and 3200y may have almost the configurations as those of the touch sensor and the guide section described as the modified example of the first embodiment, the touch sensor and the guide section described as the second embodiment, or the touch sensor and the guide section described as the third embodiment.

FIG. 19 is a block diagram showing the internal configuration of the HMD 100. The switch 35 is configured to be capable of outputting a press signal to the control unit 3300 according to a press operation of the user. If a press signal is detected at a predetermined operation position, an arithmetic operation unit 3310 of the control unit 3300 performs a particular process assigned to a GUI corresponding to the operation position, which is displayed in an image presented to the user. The process results by the arithmetic operation unit 3310 are transmitted to a signal generating unit 3320. A display image corresponding to this process is generated and displayed to the user via the display sections 4.

Figure 20:
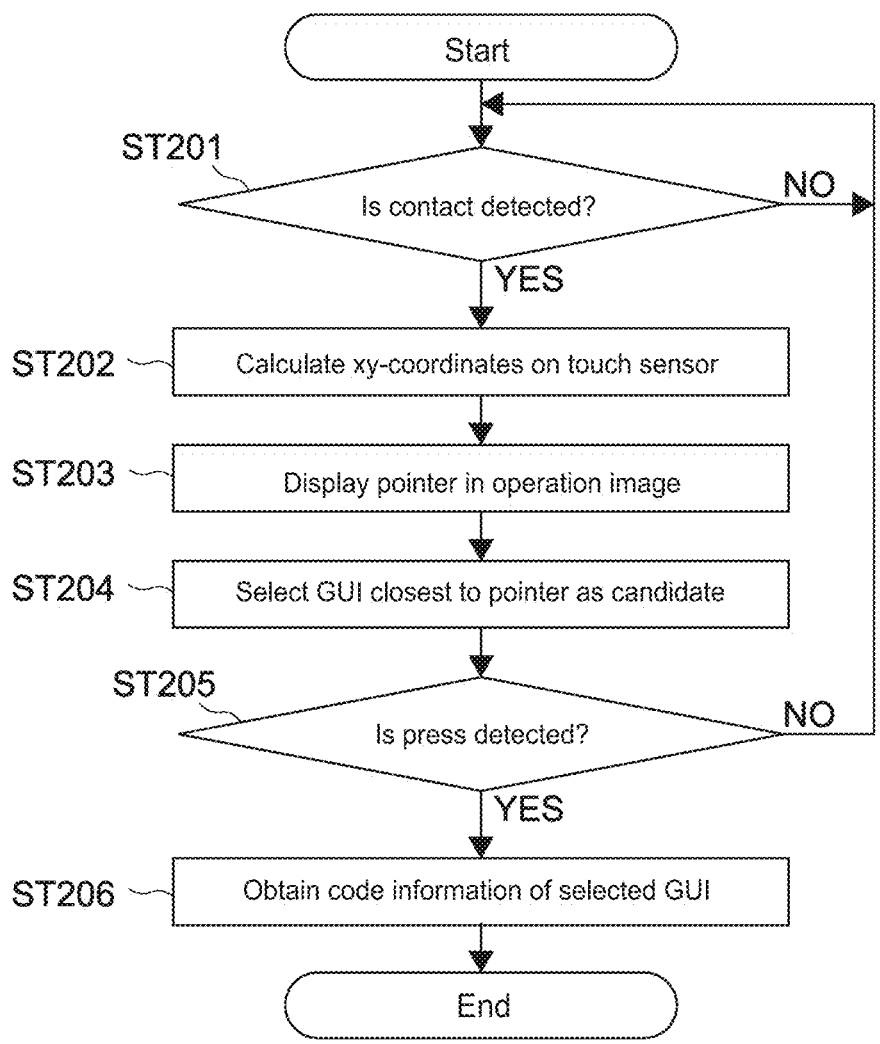
FIG. 20 A flowchart showing an operation example of the head-mounted display (control unit) according to the sixth embodiment of the present technology.

FIG. 20 is a flowchart of one operation example of the HMD 100 (control unit 3300). Here, as in the first embodiment, the operation example of the HMD 100 when the user wears and activates the HMD 100 and presses the switch 35 at a predetermined position on the touch sensor 3100x or the touch sensor 3100y.

An image V1 showing, for example, a number of GUIs is displayed to the user who wears the activated HMD 100 via the display surface 411A (see (B) of FIG. 6). As in the first embodiment, the image V1 is, for example, a menu selection image of various settings of the HMD 100 in which GUIs corresponding to a change to a silent mode of the HMD 100, volume control, and the like are shown.

The touch sensors 3100x and 3100y output detection signals for detecting a contact of the finger of the user to the control unit 3300. The arithmetic operation unit 3310 of the control unit 3300 determines a contact state based on the detection signals (Step ST201).

If detecting a contact of at least one of the guide sections 3200x and 3200y with the user (YES in Step ST201), the arithmetic operation unit 3310 of the control unit 3300 calculates an operation position of the finger on the touch sensors 3100x and 3100y based on the detection signal (Step ST202). An operation signal about the xy-coordinates of the operation position, which are calculated by the arithmetic operation unit 3310, is output to the signal generating unit 3320. In addition, an operation image V10 is presented to the user by the optical members 41 via the display element 42 (Step ST203, (B) of FIG. 6).

When the finger of the user is moved while keeping the contact with the at least one of the guide sections 3200x and 3200y (see arrow in (A) of FIG. 6), as in the first embodiment, the operation image V10 with a pointer P being moved based on the movement of the operation position of the user in a display area of the image V1 is presented (see arrow in (B) of FIG. 6).

The control unit 3300 selects a GUI closest to the calculated xy-coordinates of the operation position (hereinafter, referred to as selected GUI) as a candidate (Step ST204). The control unit 3300 determines whether or not the press signal output from the switch 35 is above a threshold value, that is, whether or not a press is detected (Step ST205). If it is determined that the press is detected (YES in Step ST205), it is considered that the execution of the process is determined and this selection candidate GUI is determined as the selected GUI. At this time, the control unit 3300 obtains code information corresponding to this selected GUI, which is stored in the storage unit 34 (Step ST206).

If not detecting the press within a predetermined period of time (NO in Step ST205), the control unit 3300 determines that the GUI as the selection candidate is not selected. Then, a contact state of the guide section 3200x or 3200y with the finger of the user is determined again and a new selection candidate GUI is selected (Steps ST201 to ST204).

In addition, the control unit 3300 performs a process corresponding to the selected GUI based on the obtained code information. With this, it is possible to display a new image based on the execution of the process to the user.

With the above-mentioned operation of the HMD 100 according to this embodiment, the user can easily determine execution of a process corresponding to a desired GUI in the image V1 by pressing the switch 35.

Further, the switch 35 according to this embodiment can be provided near the touch sensors 3100x and 3100y on the main body 200. With this, a configuration in which the input operations on the touch sensors 3100x and 3100y and the press operation can be performed with one hand at the same time can be realized. Thus, it is possible to enhance the operability on the touch sensors 3100x and 3100y.

Further, the following configurations may also be employed as modified examples of this embodiment.

MODIFIED EXAMPLE

Figure 21:
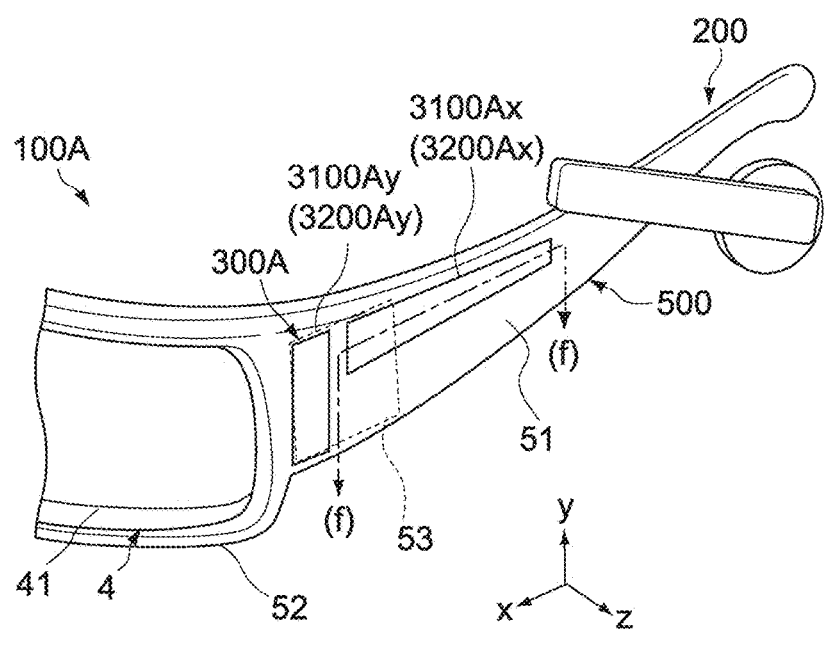
FIG. 21 A main-part schematic perspective view showing a head-mounted display according to a modified example of the sixth embodiment of the present technology.
Figure 22:
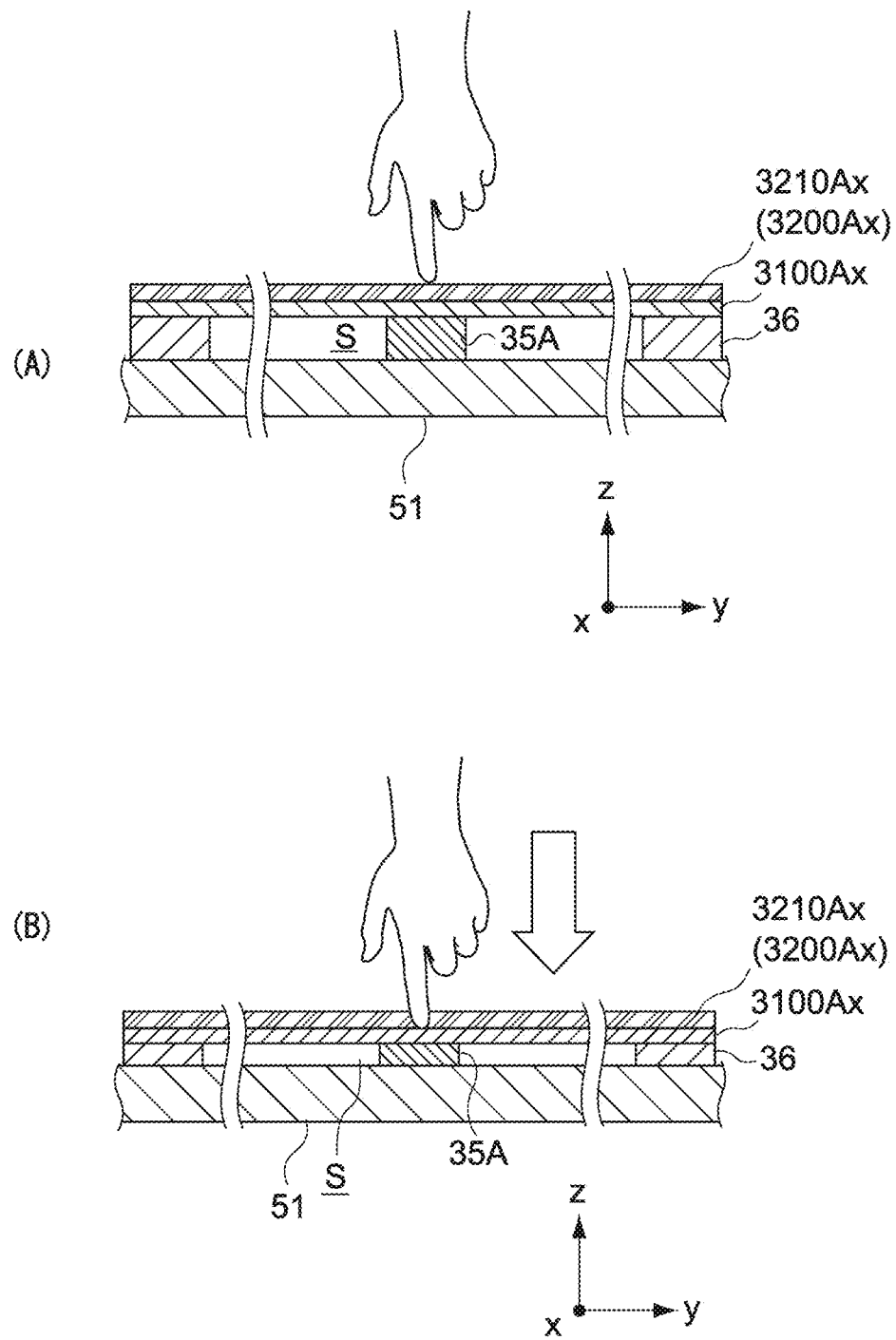
FIG. 22 A cross-sectional view taken along the (f)-(f) direction of FIG. 21 showing the head-mounted display according to the modified example of the sixth embodiment of the present technology, in which (A) is a view showing a state in which the user touches the first guide section with a finger and (B) is a view showing a state in which the user pushes the finger into the first guide section in an arrow direction.

FIG. 21 is a main-part perspective view of an HMD according to a modified example of this embodiment. (A) and (B) of FIG. 22 are both cross-sectional views taken along the (f)-(f) direction of FIG. 21. (A) shows a state in which the user touches a first surface of a guide section with the finger. (B) shows a state in which the user presses the finger into the first surface in an arrow direction.

An input operation section 300A according to this modified example includes touch sensors 3100Ax and 3100Ay and guide sections 3200Ax and 3200Ay which are almost identical to those of the first embodiment. The input operation section 300A further includes a switch 35A and a plurality of spacers 36. The plurality of spacers 36 are provided to form a space S between a temple section 51 of the main body 2 and the touch sensor 3100Ax. The switch 35A is provided in the space S and configured to be pressable via the touch sensor 3100Ax and the guide section 3200Ax. Note that FIG. 22 shows a cross-sectional view of a first surface 3210Ax of the guide section 3200Ax.

The space S is formed between the temple section 51 and the touch sensor 3100Ax that are opposed in the z-axis direction. A distance at which the space S is opposed to the temple section 51 in the z-axis direction is not particularly limited and can be appropriately set depending on the configuration of the switch 35A.

Although the positions of the plurality of spacers 36 are not particularly limited, for example, as shown in (B) of FIG. 22, the plurality of spacers 36 may be arranged near both ends of the touch sensor 3100Ax in the x-axis direction.

The switch 35A can be configured in the same manner as the switch 35. Specifically, the switch 35A is configured to be capable of outputting a press signal to the control unit 3300 by being pressed in the z-axis direction, for example. Note that the position of the switch 35A is not particularly limited. For example, it may be provided between the touch sensor 3100Ay and the temple section 51 or it may include a plurality of switches 35A and the plurality of switches 35A may be provided between the touch sensor 3100Ax and the temple section 51. Alternatively, it may be provided between each of the touch sensors 3100Ax and 3100Ay and the temple section 51.

In order to make the switch 35A pressable through the guide section 3200Ax, the following configuration may be employed. For example, the plurality of spacers 36 may be configured to be deformable in the z-axis direction due to a press above the guide section 3200Ax. In this case, a material of the plurality of spacers 36 is, for example, an elastic material such as a synthetic resin and a rubber. With this, not limited to the position of the switch 35A and the press position on the guide section 3200Ax, the touch sensor 3100Ax and the guide section 3200Ax can sink in the z-axis direction as a whole to press the switch 35A.

Alternatively, for example, the first surface 3210Ax and second surfaces 3220Ax of the guide section 3200Ax may be formed of a material elastically deformable by a pressing force above a predetermined level. For example, a transparent plastic plate made of acrylic resin, polycarbonate resin, or polyethylene-terephthalate (PET), a glass plate, or a ceramic plate is employed as such a material. In this case, the material of the plurality of spacers 36 is not limited to the elastic material.

Also with the input operation section 300A having the above-mentioned configuration, a configuration in which the operability on the touch sensors 3100Ax and 3100Ay is ensured and the press operation can be performed can be realized.

Figure 23:
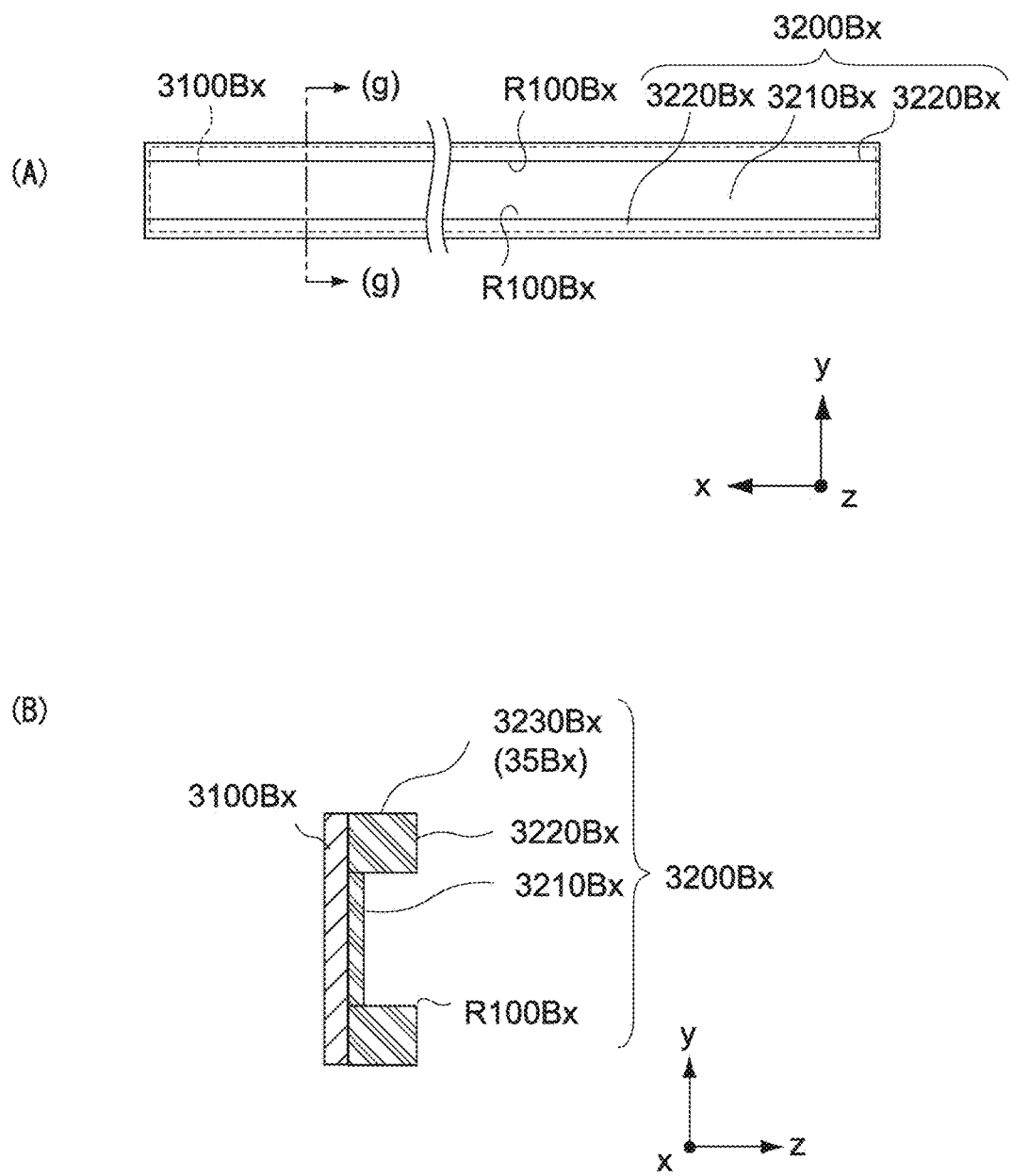
FIG. 23 A schematic view of a first detection element and a first guide section according to a modified example of the sixth embodiment of the present technology, in which (A) is a plane view and (B) is a cross-sectional view taken along the (g)-(g) direction of (A).

Further, FIG. 23 shows a touch sensor, a guide section, and a switch according to a modified example of this embodiment, in which (A) is a plane view and (B) is a cross-sectional view taken along the (g)-(g) direction of (A). A switch 35Bx according to this modified example is formed of two protrusions 3230Bx that extend on a touch sensor 3100Bx along the x-axis direction.

For example, as in the first embodiment, the touch sensor 3100Bx includes a plurality of first electrodes that are arranged at predetermined intervals in the x-axis direction and formed to have almost the same width as a width of the touch sensor 3100Bx in the y-axis direction.

A guide section 3200Bx includes a first surface 3210Bx that extends in the x-axis direction, the two protrusions 3230Bx that project from the first surface 3210Bx in the z-axis direction and extend along the x-axis direction while sandwiching the first surface 3210Bx therebetween, and two second surfaces 3220Bx that constitute top surfaces of the two protrusions 3230Bx. In the first surface 3210Bx and the two second surfaces 3220Bx, steps are formed via the protrusions 3230Bx. Further, two ridges R100Bx are formed along boundaries between these surfaces, that is, edges of the two protrusions 3230Bx.

The two protrusions 3230Bx are formed to be pressable in the z-axis direction as in the switch 35 and configured to be capable of outputting a press signal to the control unit 3300. For example, the protrusions 3230Bx may have two contact points that are touchable due to a press operation from an outside or may be constituted of capacitive elements that detect a press operation based on a change in capacitance between a pair of electrodes that are opposed to each other in the z-axis direction. The protrusions 3230Bx are formed of an electrical insulating material, for example, plastic such as polycarbonate resin and polyethylene-terephthalate (PET), elastic material such as rubber material, glass, or ceramics.

Note that a width of the touch sensor 3100Bx along the y-axis direction may be almost the same as a width of the guide section 3200Bx, for example, as shown in FIG. 23. With this, a configuration in which contacts of the protrusions 3230Bx on the second surfaces 3220Bx can be detected can be realized. Alternatively, as in the touch sensor 31Bx according to the second embodiment, it may be set to be almost the same as a width of the first surface 3210Bx and may be provided corresponding only to the first surface 3210Bx.

In this modified example, the configuration in which the protrusions 3230Bx also serve as the first guide section. With this, the user can recognize the position of the touch sensor 3100Bx, the x-axis direction, and the like by sensing the ridges R100Bx formed in the protrusions 3230Bx. Thus, the user can select a desired GUI or the like on the touch sensor 3100Bx and can cause the HMD to perform a determination of a process corresponding to this GUI or the like by pressing the protrusions 3130Bx.

<Seventh Embodiment>

Figure 24:
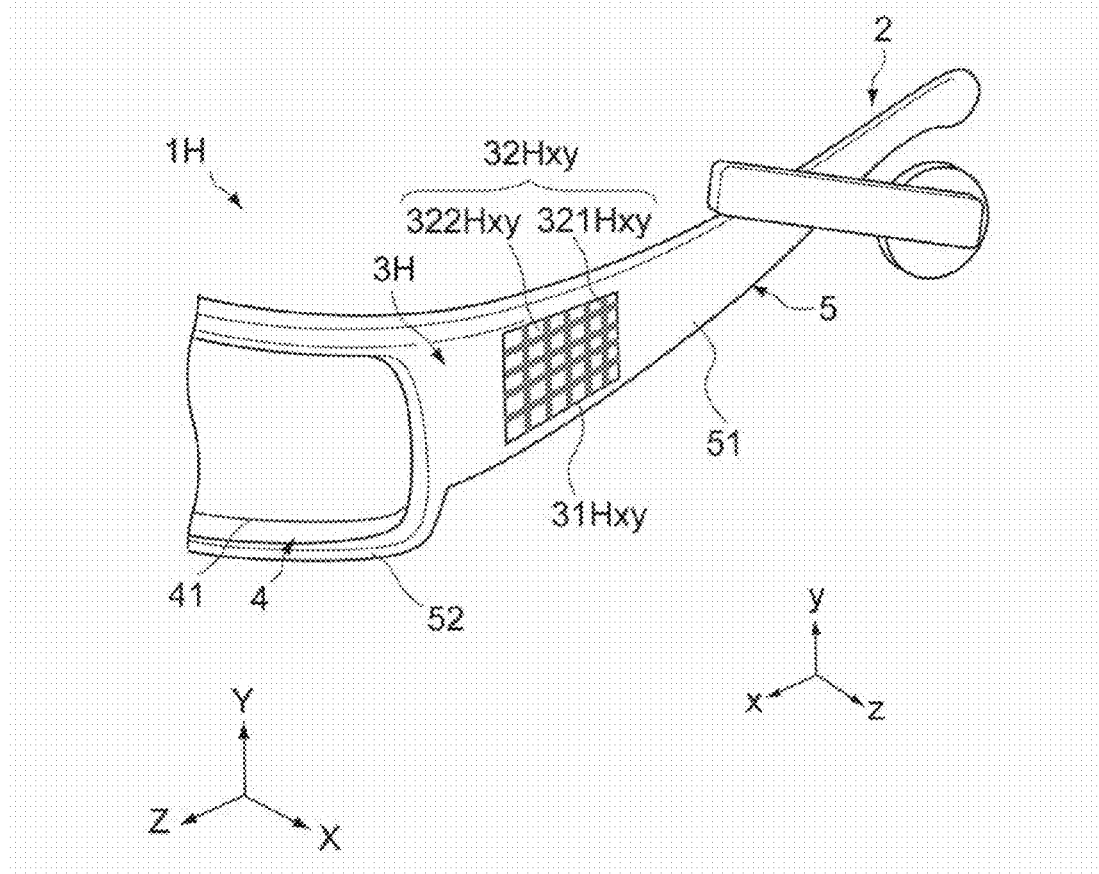
FIG. 24 A main-part schematic perspective view showing a head-mounted display according to a seventh embodiment of the present technology.

FIG. 24 is a main-part schematic perspective view showing an HMD according to a seventh embodiment of the present technology. In this embodiment, descriptions of the same portions as the configurations and actions of the first embodiment will be omitted or simplified and portions different from those of the first embodiment will be mainly described.

In this embodiment, a first detection element (touch sensor) 31Hxy is constituted of a two-dimensional electrostatic sensor that electrostatically detects a contact or a proximity position of the finger of the user along the x-axis direction and the y-axis direction. The touch sensor 31Hxy is disposed on a surface of the temple section 51. For example, the touch sensor 31Hxy is formed in a rectangular thine plate shape having a thickness in the z-axis direction. Although not shown in the figure, it includes a plurality of first electrodes for x-position detection that are arranged at predetermined intervals in the x-axis direction and a plurality of second electrodes for y-position detection that are arranged at predetermined intervals in the y-axis direction.

A guide section 32Hxy is provided on the touch sensor 31Hxy. The guide section 32Hxy includes first surfaces 321Hxy that are arranged at predetermined intervals in the x-axis direction and the y-axis direction and formed in a grid manner and a plurality of second surfaces 322Hxy that are recessed from the first surfaces 321Hxy. Specifically, the first surfaces 321Hxy correspond to top surfaces of protrusions formed in a grid manner in a surface of the guide section 32Hxy. Further, the plurality of second surfaces 322Hxy correspond to bottoms of a plurality of grooves that are formed surrounded by the first surfaces 321Hxy and arranged at predetermined intervals in the x-axis direction and the y-axis direction. A plurality of ridges are formed at boundaries between the first surfaces 321Hxy and the second surfaces 322Hxy along edges of the first surfaces 321Hxy.

Note that the configuration of the guide section 32Hxy is not limited to the above and, for example, a configuration in which the second surfaces 322Hxy project from the first surfaces 321Fx and the ridges are formed at the edges of the second surfaces 322Hxy is also possible.

As described above, an HMD 1H according to this embodiment is capable of detecting a two-dimensional movement of the user or the like in an xy-plane with the single touch sensor 31Hxy, and hence can be manufactured at low costs. Further, by providing the guide section 32Hxy with the above-mentioned configuration, even if the touch sensor 31Hxy is a two-dimensional touch sensor, the user can know the position, the shape, and the like of the touch sensor. In addition, the ridges are arranged at predetermined intervals in the x-axis direction and the y-axis direction, and hence the user can know a relative movement distance on the touch sensor 31Hxy by sensing the ridges by touch. Thus, it is possible to realize high operability.

Although the embodiments of the present technology have been described above, the present technology is not limited thereto and more various modifications can be made based on the technical conception of the present technology.

For example, FIGS. 25 and 26 are views explaining a modified example according to an embodiment of the present technology. In this modified example, it is possible to detect each of two or more contact points on the touch sensor 31Fx. This makes it possible to perform a so-called "pinch-and-zoom" operation of enlarging or reducing an image V11 or V12.

For example, when the user touches a guide section 32Fx with two fingers and widens a distance therebetween as shown in (A) of FIG. 25, the image V11 can be enlarged in size based on a detected distance and a change thereof as shown in (B) of FIG. 25. On the other hand, when the user touches the guide section 32Fx with two fingers and shortens the distance therebetween as shown in (A) of FIG. 26, the image V12 can be reduced in size based on a detected distance and a change thereof as shown in (B) of FIG. 26.

As described above, according to the modified example above, it becomes possible to change a display area of the image without viewing the guide section 32Fx and a hand that performs an input operation. In addition, the guide section 32Fx includes the ridges RFx, and hence the user can easily perform a pinch-and-zoom operation along the x-axis direction.

Alternatively, in this modified example, it may be possible to detect each of two or more contact positions of a touch sensor (not shown) that extends in the y-axis direction. Alternatively, touch sensors that extend in the x-axis direction and the y-axis direction may be configured to enable a pinch-and-zoom operation to be performed. With this, an HMD that enables a variety of operations to be performed can be provided. Further, the input operation section according to this modified example is applicable to any of the HMDs according to the first to sixth embodiments as long as it can detect the two or more contact positions on the touch sensor 31Fx.

Further, FIGS. 27 and 28 are views explaining a modified example according to an embodiment of the present technology. In this modified example, it is possible to select a number of icons arranged in an image V2 according to an input operation on a touch sensor 31Gx. The image V2 may be, for example, a menu selection image for various settings of an HMD or may be thumbnail images or the like for selecting video content.

For example, as shown in (B) of FIG. 27 and (B) of FIG. 28, a plurality of icons are arranged in the X-axis direction and the Y-axis direction in the image V2 presented to the user. When the user wishes to touch a predetermined operation position q1 on a guide section 32Gx with the finger ((A) of FIG. 27), an operation image V21 with an icon Q1 being selected is presented to the user ((B) of FIG. 27). In addition, when the user moves the finger to a predetermined operation position q2 on the guide section 32Gx in the x-axis direction while keeping the contact of the finger ((A) of FIG. 28), a predetermined icon Q2 located at a coordinate position spaced away from the icon Q1 in the X-axis direction depending on the movement amount is, for example, selected in the image V2. With this, an operation image V22 with the icon Q2 being selected is presented to the user ((B) of FIG. 28).

As described above, according to this modified example, it is possible to select an icon corresponding to a desired function or the like from among a number of icons. Further, also with the HMD according to this modified example, it may be possible to perform a tap operation, press a switch, or the like on a desired icon, to thereby determine execution of a process corresponding to the icon. Note that an input operation section according to this modified example is applicable to any of the HMDs according to the first to sixth embodiments.

Figure 29:
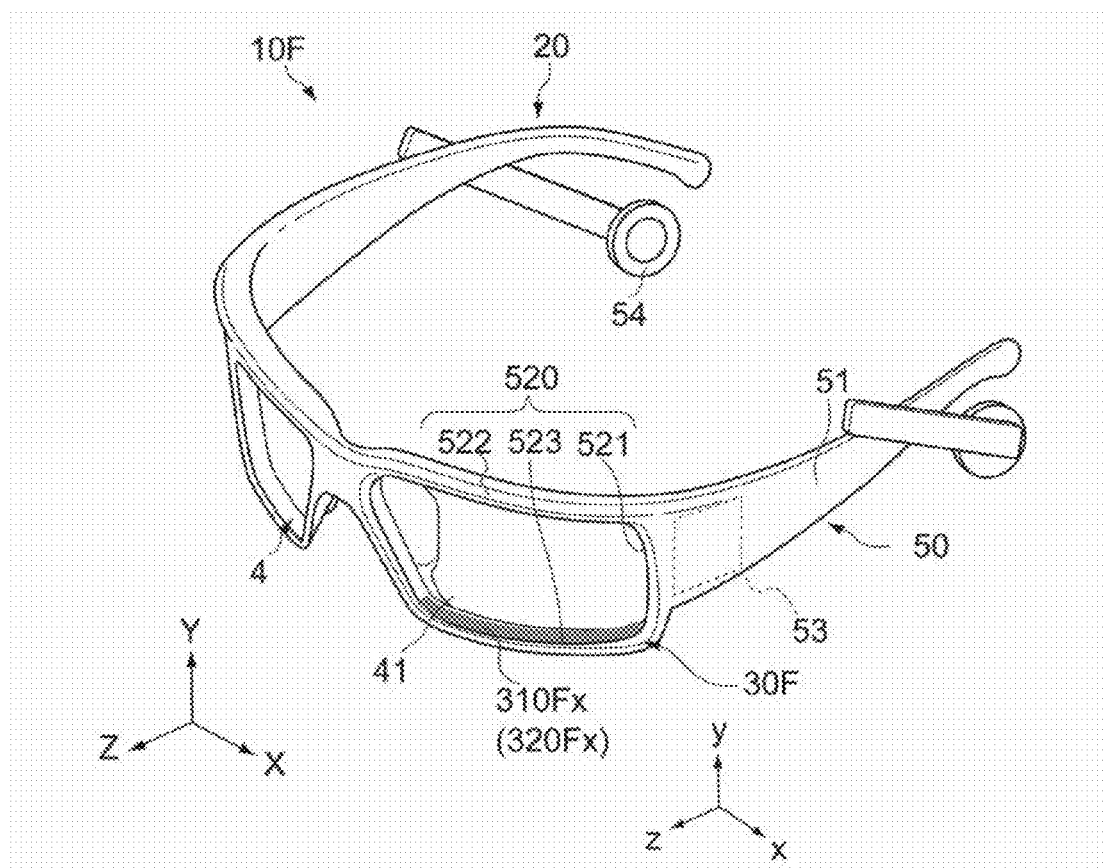
FIG. 29 A schematic perspective view showing a head-mounted display according to a modified example of the fifth embodiment of the present technology.

FIG. 29 is a view showing a modified example of the fifth embodiment. A touch sensor 310Fx and a guide section 320Fx according to this modified example are provided on an outer surface of an optical member 41. In this case, the guide section 320Fx is formed of a see-through material such as a transparent plastic plate made of polycarbonate resin, polyethylene-terephthalate (PET), or the like, a glass plate, and a ceramic plate and a first electrode of the touch sensor 310Fx is formed of, for example, a transparent electrode such as an ITO electrode, and hence the see-through configuration as a whole can be realized. With this, an HMD 10F according to this embodiment can be configured as a see-through HMD 10F even if the touch sensor 310Fx and the guide section 320Fx are provided on the optical member 41.

Further, in the HMD 10F having such a configuration, by providing the touch sensor 310Fx along a rim section 52, an edge of the rim section 52 can be used as the first guide section. Therefore, the configuration of the HMD 10F can be simple even with the first guide section.

Although, in each of the above-mentioned embodiments, for example, the touch sensor 31x is formed in the one thin plate shape having the longitudinal direction in the x-axis direction, the width direction in the y-axis direction, and the thickness direction in the z-axis direction, it is not limited thereto. For example, a configuration in which three touch sensors 31x respectively corresponding to the first surface 321x and the two second surfaces 322x are provided is also possible. With this, distances between the second surfaces 322x and the touch sensors 31x are shorter and a configuration in which it is easier to detect a contact can be realized.

Further, although, in the first embodiment, the first guide section 32x includes the two ridges Rx formed along the edges of the second surfaces 322x, it is not limited thereto. For example, a configuration in which the first surface and the second surfaces are continuous as smooth curved surfaces and the first guide section includes these curved surfaces is possible. Also with this, it is possible to cause the user to recognize the position and the extending direction of the touch sensor, which can enhance the operability of the HMD, and to improve the touch feeling and contact safety of the first guide section.

In the third embodiment, for example, a configuration in which x-coordinates corresponding to the plurality of second surfaces 322Dx correspond to X-coordinates of the icons in the image presented to the user, which are shown in (B) of FIG. 27 or (B) of FIG. 28, is also possible. In other words, a configuration in which the icons in a predetermined row that are arranged in the X-axis direction are selected by touching either one of the second surfaces 322Dx is possible. Similarly, for example, a configuration in which y-coordinates of operation positions corresponding to a plurality of second surfaces 322Dy correspond to Y-coordinates of the icons in the image presented to the user, which are described with reference to (B) of FIG. 27 or (B) of FIG. 28, is also possible. With an HMD 1D having such a configuration, correspondences between input operations on the touch sensors 31Dx and 31Dy and presented images become clear, and hence it is possible to enhance the operability when the user selects an icon.

Note that the touch sensor 31Dx is not limited to be provided corresponding to the entire guide section 32Dx as shown in FIG. 10. For example, a configuration in which the first electrodes of the touch sensor 31Dx are arranged only on the plurality of second surfaces 322Dx is possible. Alternatively, a configuration in which the first electrodes are arranged only on the plurality of first surfaces 321Dx is also possible.

Further, although, in each of the above-mentioned embodiments, the tap operation, the press operation on the switch, and the like are employed as the operations for determining the execution of the process corresponding to the GUI or the like selected according to the input operation, it is not limited thereto. For example, the HMD may be configured to detect a push-in by the user on the touch sensor based on a change in a detection signal from the touch sensor. Specifically, with an electrostatic capacitance sensor, an area of the finger or the like in contact with the touch sensor increases due to a push-in operation and a capacitance value is larger than that in normal contact. With this, if detecting a capacitance value equal to or larger than a predetermine threshold value, the control unit can be configured to determine that a push-in operation is performed and to perform a predetermined process.

As another example for detecting a push-in amount, a pressure-sensitive sensor for detecting the push-in amount may be used. For example, the pressure-sensitive sensor may include one or more pairs of electrodes that are provided between the touch sensor and the temple section and opposed in the z-axis direction and be configured to detect a contact pressure based on a change in capacitance between the electrodes that is caused due to a deflection of the guide section. Alternatively, one including an elastic body between the pair of electrodes may be employed as the pressure-sensitive sensor. In this case, a contact pressure is detected based on a change in capacitance between the electrodes that is caused by an elastic deformation of the guide section due to a press operation. Other than this, for example, a piezoelectric sensor using a piezoelectric element or a strain gage may be used as the pressure-sensitive sensor. Also with an HMD including such a pressure-sensitive sensor, it is possible to determine execution of a process according to an intention of the user.

Further, although, in each of the above-mentioned embodiments, the main body 2 includes the housing section 53 that houses the display element 42 and the like, it is not limited to this configuration. For example, the main body may include casings that house the display elements and the like and are fixed to the frame section. For example, the casings may be fixed to the temple sections such that they are opposed to vicinities of the temples of the user upon mounting. Alternatively, the casings may also be configured to house the control unit, the storage unit, the communication unit, the speaker, and the like.

Although the see-through HMD has been described in each of the embodiments above, it is not limited thereto and a non-see-through HMD may be employed. Also in this case, the user can perform smooth input operations without viewing the hand by performing an operation on the guide section while sensing the first and second guide sections by touch.

Note that the present technology may also employ the following configurations.

(1) A head-mounted display, including:
  a main body that includes a display section configured to present an image to a user and is configured to be mountable on a head of the user; and
  an input operation section for controlling the image, the input operation section including
    a first detection element that extends in a first axis direction and is provided in the main body and electrostatically detects an operation position in the first axis direction, and
    a first guide section that guides an input operation of the user along the first axis direction on the first detection element.

(2) The head-mounted display according to (1), in which
  the first guide section includes at least one ridge provided on the first detection element along the first axis direction.

(3) The head-mounted display according to (2), in which
  the first guide section includes a first surface that extends along the first axis direction, and two second surfaces that project from the first surface and extend along the first axis direction while sandwiching the first surface therebetween, and
  the ridge includes two ridges each formed at a boundary between the first surface and each of the two second surfaces.

(4) The head-mounted display according to (2), in which
  the first guide section includes a first surface that extends along the first axis direction, and two second surfaces that are recessed from the first surface and extend along the first axis direction while sandwiching the first surface therebetween, and
  the ridge includes two ridges each formed at a boundary between the first surface and each of the two second surfaces.

(5) The head-mounted display according to (1), in which
  the first guide section includes a plurality of first surfaces that are arranged along the first axis direction, and a plurality of second surfaces that project from the plurality of first surfaces and are arranged alternately with the plurality of first surfaces along the first axis direction, and
  the first guide section includes a plurality of ridges each formed at a boundary between each of the plurality of second surfaces and each of the plurality of first surfaces.

(6) The head-mounted display according to any one of (1) to (5), in which
  the main body includes a temple section that is placed on a temporal region of the user, and
  the first detection element is disposed on the temple section.

(7) The head-mounted display according to (6), in which
  the temple section includes an edge section that extends in the first axis direction,
  the first detection element is provided along the edge section, and
  the first guide section includes the edge section.

(8) The head-mounted display according to any one of (1) to (5), in which
  the display section includes a plate-like optical member that displays the image,
  the main body includes a rim section that supports a periphery of the optical member, and
  the first detection element is disposed on the rim section.

(9) The head-mounted display according to any one of (1) to (5), in which
  the display section includes a plate-like optical member that displays the image, and
  the first detection element is disposed on the optical member.

(10) The head-mounted display according to any one of (1) to (9), in which
  the input operation section further includes
    a control unit that calculates a coordinate position in the image, which corresponds to the operation position, and controls, based on the coordinate position, a movement of a pointer displayed on the image.

(11) The head-mounted display according to (10), in which
  the control unit executes a process based on the coordinate position, generates an image signal corresponding to the process result, and outputs the image signal to the display section, and
  the input operation section further includes
    a switch that is configured to be pressable and outputs a press signal for determining execution of the process to the control unit.

(12) The head-mounted display according to (11), in which
  the input operation section further includes
    a plurality of spacers that are provided to form a space between the main body and the first detection element, and
  the switch is provided in the space and configured to be pressable through the first detection element.

(13) The head-mounted display according to (11), in which
  the switch includes at least one protrusion that extends along the first axis direction on the first detection element, and
  the first guide section includes a ridge formed in the protrusion.

(14) The head-mounted display according to any one of (1) to (13), in which
  the input operation section further includes
    a second detection element that extends in a second axis direction different from the first axis direction and are provided in the main body and detects an operation position in the second axis direction, and
    a second guide section that guides an input operation of the user along the second axis direction on the second detection element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS 1, 1D, 1E, 1H, 10, 10A, 10B, 10C, 10D, 10E, 10F, 100 head-mounted display (HMD)
2, 2E, 20, 200 main body
3, 3H, 30, 300, 300A input operation section
4 display section
5, 50 frame section
31x, 31Ax, 31Bx, 31Cx, 31Dx, 31Ex, 31Fx, 31Gx, 31Hxy, 310y, 310Ax, 310Bx, 310Cx, 310Dx, 310Ex1, 310Ex2, 310Fx, 3100x, 3100Ax, 3100Bx first detection element (touch sensor)
31y, 310Cy, 310Dy, 310Ey, 3100y, 3100Ay second detection element (touch sensor)
32x, 32Ax, 32Bx, 32Cx, 32Dx, 32Fx, 31Gx, 32Hxy, 320y, 320Ax, 320Bx, 320Cx, 320Dx, 320Ex1, 320Ex2, 320Fx, 3200x, 3200Ax, 3200Bx first guide section
32y, 320Cy, 320Dy, 320Ey, 3200y, 3200Ay second guide section
33, 3300 control unit
35, 35A, 35Bx switch
36 spacer
41 optical member
51, 51E temple section
52, 520 rim section
55E edge section
321x, 321Ax, 321Bx, 321Cx, 321Dx, 321Hxy, 3210y, 3210Bx first surface
322x, 322Ax, 322Bx, 322Cx, 322Dx, 322Hxy, 3220Bx second surface
3130Bx protrusion
Rx, Ry, RAx, RBx, RCx, RDx, R100Bx ridge
P pointer
S space

The invention claimed is:
1. A head-mounted display, comprising:
a main body that includes a display section configured to present an image to a user and is configured to be mountable on a head of the user; and
an input operation section for controlling the image, the input operation section including
a first detection element that extends in a first axis direction and is provided in the main body and electrostatically detects an operation position in the first axis direction, and
a first guide section that guides an input operation of the user along the first axis direction on the first detection element,
wherein the first guide section includes a plurality of first surfaces that are arranged along the first axis direction, and a plurality of second surfaces that project from the plurality of first surfaces and are arranged alternately with the plurality of first surfaces along the first axis direction, and
wherein the first guide section includes a plurality of ridges each formed at a boundary between each of the plurality of second surfaces and each of the plurality of first surfaces.

2. The head-mounted display according to claim 1, wherein the first guide section includes at least one ridge provided on the first detection element along the first axis direction.

3. The head-mounted display according to claim 2, wherein
the first guide section includes a first surface that extends along the first axis direction, and two second surfaces that project from the first surface and extend along the first axis direction while sandwiching the first surface therebetween, and
the ridge includes two ridges each formed at a boundary between the first surface and each of the two second surfaces.

4. The head-mounted display according to claim 2, wherein the first guide section includes a first surface that extends along the first axis direction, and two second surfaces that are recessed from the first surface and extend along the first axis direction while sandwiching the first surface therebetween, and
the ridge includes two ridges each formed at a boundary between the first surface and each of the two second surfaces.

5. The head-mounted display according to claim 1, wherein
the main body includes a temple section that is placed on a temporal region of the user, and
the first detection element is disposed on the temple section.

6. The head-mounted display according to claim 5, wherein
the temple section includes an edge section that extends in the first axis direction,
the first detection element is provided along the edge section, and
the first guide section includes the edge section.

7. The head-mounted display according to claim 1, wherein the display section includes a plate-like optical member that displays the image,
the main body includes a rim section that supports a periphery of the optical member, and
the first detection element is disposed on the rim section.

8. The head-mounted display according to claim 1, wherein
the display section includes a plate-like optical member that displays the image, and
the first detection element is disposed on the optical member.

9. The head-mounted display according to claim 1, wherein
the input operation section further includes
a control unit that calculates a coordinate position in the image, which corresponds to the operation position, and controls, based on the coordinate position, a movement of a pointer displayed on the image.

10. The head-mounted display according to claim 9, wherein
the control unit executes a process based on the coordinate position, generates an image signal corresponding to the process result, and outputs the image signal to the display section, and
the input operation section further includes
a switch that is configured to be pressable and outputs a press signal for determining execution of the process to the control unit.

11. The head-mounted display according to claim 10, wherein the input operation section further includes
a plurality of spacers that are provided to form a space between the main body and the first detection element, and
the switch is provided in the space and configured to be pressable through the first detection element.

12. The head-mounted display according to claim 10, wherein
the switch includes at least one protrusion that extends along the first axis direction on the first detection element, and
the first guide section includes a ridge formed in the protrusion.

13. The head-mounted display according to claim 1, wherein
the input operation section further includes
a second detection element that extends in a second axis direction different from the first axis direction and are provided in the main body and detects an operation position in the second axis direction, and
a second guide section that guides an input operation of the user along the second axis direction on the second detection element.

14. A head-mounted display, comprising:
a main body that includes a display section configured to present an image to a user and is configured to be mountable on a head of the user; and
an input operation section for controlling the image, the input operation section including
a first detection element that extends in a first axis direction and is provided in the main body and electrostatically detects an operation position in the first axis direction, and
a first guide section that guides an input operation of the user along the first axis direction on the first detection element,
wherein the first guide section includes at least one ridge provided on the first detection element along the first axis direction,
wherein the first guide section includes a first surface that extends along the first axis direction, and two second surfaces that are recessed from the first surface and extend along the first axis direction while sandwiching the first surface therebetween, and
wherein the ridge includes two ridges each formed at a boundary between the first surface and each of the two second surfaces.

15. A head-mounted display, comprising:
a main body that includes a display section configured to present an image to a user and is configured to be mountable on a head of the user; and
an input operation section for controlling the image, the input operation section including
a first detection element that extends in a first axis direction and is provided in the main body and electrostatically detects an operation position in the first axis direction, and
a first guide section that guides an input operation of the user along the first axis direction on the first detection element,
wherein the input operation section further includes a control unit that calculates a coordinate position in the image, which corresponds to the operation position, and controls, based on the coordinate position, a movement of a pointer displayed on the image,
wherein the control unit is configured to execute a process based on the coordinate position, generate an image signal corresponding to the process result, and output the image signal to the display section, and the input operation section further includes a switch that is configured to be pressable and the input operation section is configured to output a press signal for determining execution of the process to the control unit, and
wherein the switch includes at least one protrusion that extends along the first axis direction on the first detection element, and the first guide section includes a ridge formed in the protrusion.

16. The head-mounted display according to claim 1, wherein the ridges include a square-shaped edge or a round-shaped edge.

17. The head-mounted display according to claim 14, wherein the ridge includes a square-shaped edge or a round-shaped edge.

18. The head-mounted display according to claim 15, wherein the ridge includes a square-shaped edge or a round-shaped edge.

* * * * *